United States Patent [19]

Hirata et al.

[11] Patent Number: 4,630,231
[45] Date of Patent: Dec. 16, 1986

[54] CONTROL PROGRAM SIGNAL DEMODULATING DEVICE

[75] Inventors: Atsumi Hirata, Fujisawa; Shunichi Shichijo, Sagamihara; Toyotaka Machida, Kashiwa; Kenji Kaneko; Tatsuya Shinyagaito, both of Iwai, all of Japan

[73] Assignee: Victor Company of Japan, Ltd., Japan

[21] Appl. No.: 574,520

[22] Filed: Jan. 27, 1984

[30] Foreign Application Priority Data

Jan. 31, 1983 [JP] Japan .................... 58-13946

[51] Int. Cl.⁴ .................... G06F 3/00; G11B 7/00
[52] U.S. Cl. .................... 364/900; 358/342; 369/32
[58] Field of Search .............. 364/200 MS, 900 MS, 364/410, 411; 358/342, 343, 143, 102, 305, 903; 369/32, 47, 111, 59; 360/10.1, 19.1; 273/316, 333; 73/607, 608; 365/215, 234

[56] References Cited

U.S. PATENT DOCUMENTS

| | | | |
|---|---|---|---|
| 3,931,457 | 1/1976 | Maria | 358/342 |
| 3,962,688 | 6/1976 | Natanael | 365/234 |
| 4,028,733 | 7/1977 | Ulicki | 364/900 |
| 4,094,079 | 6/1978 | Dorsett | 35/8 A |
| 4,142,209 | 2/1979 | Hedlund et al. | 358/342 |
| 4,305,131 | 12/1981 | Best | 364/410 X |
| 4,361,849 | 11/1982 | Bolger | 360/10.1 X |
| 4,476,499 | 10/1984 | Kanamaru et al. | 369/32 X |
| 4,490,810 | 12/1984 | Hon | 364/900 |
| 4,510,531 | 4/1985 | Sugiyama | 358/342 |
| 4,575,770 | 3/1986 | Dieterich | 369/47 |

FOREIGN PATENT DOCUMENTS 20024858  3/1981  European Pat. Off. .
8304463  12/1983  PCT Int'l Appl. .

OTHER PUBLICATIONS

Educational/Institutional Features of the Optical Videodisc System, by R. T. Cavanagh, Journal of the SMPTE, vol. 86, Apr. 1977, pp. 201-203.

Primary Examiner—James D. Thomas
Assistant Examiner—William G. Niessen
Attorney, Agent, or Firm—Andrus, Sceales, Starke & Sawall

[57] ABSTRACT

A control program signal demodulating device comprises a control program demodulator for obtaining a demodulated output of a control program signal from a signal which is reproduced from a rotary recording medium which is recorded with at least the control program signal together with a video signal, where the control program signal indicates a control program including input and output commands and internal processing commands of an external device such as a computer which has a discriminating function and is coupled to a player which plays the rotary recording medium, a memory circuit for at least temporarily storing the demodulated output of the control program demodulator and producing the stored demodulated output, a selecting circuit for selectively producing data received from the memory circuit in response to a transmission request, an interface circuit for transmitting the data which is produced from the selecting circuit to the external device, and for receiving one or a plurality of control commands from the external device, and a command analyser for decoding one or a plurality of control commands received from the interface circuit, and for generating a signal which controls the operation of the player or a signal which requests transmission with respect to the memory circuit and the selecting circuit.

10 Claims, 36 Drawing Figures

FIG. 2
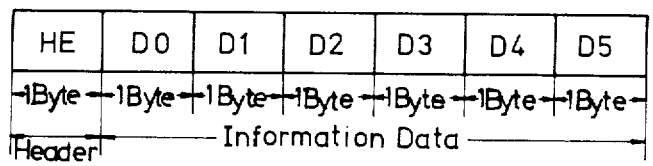
FIG. 3
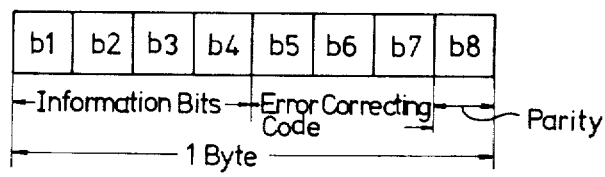
FIG. 4
| Information Bits | | | | Check Bits | | | |
|---|---|---|---|---|---|---|---|
| | | | | Hamming Correction | | | Odd Parity |
| b1 | b2 | b3 | b4 | b5 | b6 | b7 | b8 |
| 0 | 0 | 0 | 0 | 1 | 1 | 1 | 0 |
| 1 | 0 | 0 | 0 | 0 | 0 | 0 | 0 |
| 0 | 1 | 0 | 0 | 1 | 0 | 0 | 1 |
| 1 | 1 | 0 | 0 | 0 | 1 | 1 | 1 |
| 0 | 0 | 1 | 0 | 0 | 1 | 0 | 1 |
| 1 | 0 | 1 | 0 | 1 | 0 | 1 | 1 |
| 0 | 1 | 1 | 0 | 0 | 0 | 1 | 0 |
| 1 | 1 | 1 | 0 | 1 | 1 | 0 | 0 |
| 0 | 0 | 0 | 1 | 0 | 0 | 1 | 1 |
| 1 | 0 | 0 | 1 | 1 | 1 | 0 | 1 |
| 0 | 1 | 0 | 1 | 0 | 1 | 0 | 0 |
| 1 | 1 | 0 | 1 | 1 | 0 | 1 | 0 |
| 0 | 0 | 1 | 1 | 1 | 0 | 0 | 0 |
| 1 | 0 | 1 | 1 | 0 | 1 | 1 | 0 |
| 0 | 1 | 1 | 1 | 1 | 1 | 1 | 1 |
| 1 | 1 | 1 | 1 | 0 | 0 | 0 | 1 |
⟶ Transmitting Sequence

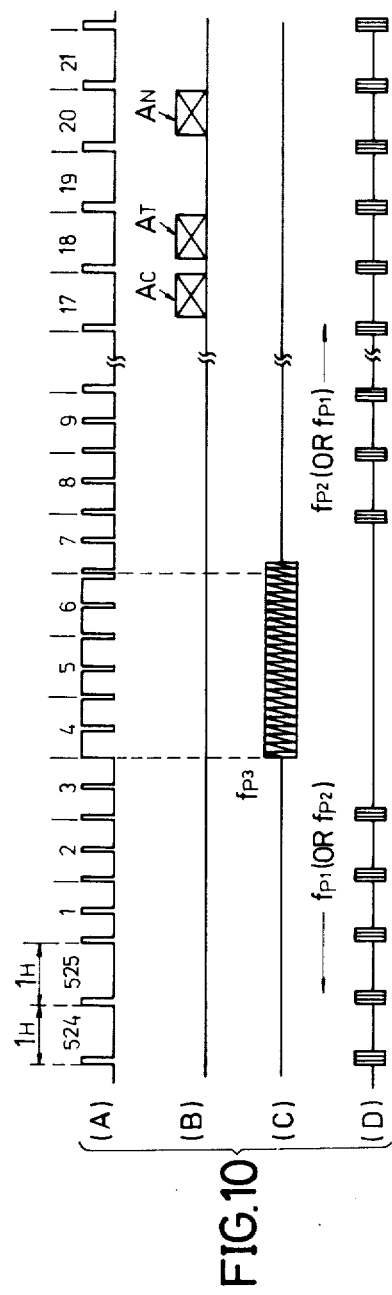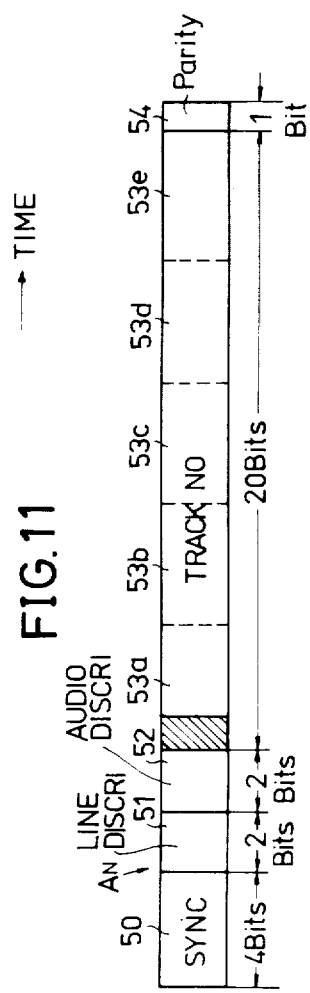
FIG.10
FIG.11

CONTROL PROGRAM SIGNAL DEMODULATING DEVICE

BACKGROUND OF THE INVENTION

The present invention generally relates to control program signal demodulating devices, and more particularly to a control program signal demodulating device which demodulates a control program signal from a signal which is reproduced from a rotary recording medium in a reproducing apparatus and transmits this demodulated control program signal to an external device such as a computer which has a discriminating function, and also decodes control commands which are received from the external device and controls the operations of the reproducing apparatus based on the decoded control commands. The rotary recording medium is recorded with a video signal together with an audio signal which is time-sequentially (time-divisionally) multiplexed with the control program signal of the external device, or together with the control program signal which is recorded independently instead of the audio signal.

Heretofore, attempts have been made to more effectively utilize information signals which are recorded on a rotary recording medium (hereinafter simply referred to as a disc). Such attempts include coupling to a disc reproducing apparatus an external device such as a personal computer which has a discriminating function, for example, and controlling the disc reproducing apparatus by the personal computer. For example, the personal computer may be coupled to a reproducing apparatus designed to play a video disc which is recorded with a video signal and audio signals on a spiral track or concentric tracks thereon as variations in geometrical configuration. In this case, it becomes possible to play the video disc in the so-called interactive mode, and this feature enables the video disc to be used in various applications including the recording of educational programs and the recording of games. In addition, when a personal computer is coupled to a reproducing apparatus designed to play an audio disc, it is possible to monitor a picture which is related to a reproduced sound and is generated in the personal computer, at the same time as when the audio signals are reproduced from the audio disc to produce the reproduced sound. Thus, in this case, the picture which is generated simultaneously as the production of the reproduced sound, makes it more interesting and enjoyable for the listener to play the audio disc.

In order to control the disc reproducing apparatus by the personal computer, and generate in the personal computer an information which is related to the signal which is reproduced from the disc, it is of course necessary to load a control program into the personal computer. This control program must be written in a predetermined program language which is in conformance with an interpreter of the personal computer which is used or in conformance with a monitoring device or the like. Hence, it was necessary to prepare a certain number of control programs according to the information content (kind) of the disc. Further, it was only possible to play a disc for which control programs, written in predetermined languages employed in the personal computers which are anticipated on being used, have been prepared, even with respect to the same kind of disc.

In addition, since the video disc did not contain the control program, the control program had to be kept independently by the user. Accordingly, as the number of kinds of the video discs which are kept by the user increased, a corresponding number of control programs had to be kept independently by the user. Thus, there was a problem in that it took up space to keep the large number of control programs. Moreover, when controlling the video disc reproducing apparatus by the personal computer according to the conventional method, there was only a unidirectional path between the personal computer and the video disc reproducing apparatus. In other words, the information from the personal computer was simply supplied to the video disc reproducing apparatus, and it was impossible to detect the state of the video disc reproducing apparatus by the personal computer.

On the other hand, there is a kind of audio disc which is recorded with the control program on an inner peripheral portion thereof, for example. However, in such an audio disc, the recording capacity of the audio signals becomes small, because the signal which represents the control program is recorded on tracks which are distinguished from the tracks which are recorded with the audio signals. Further, a desired operation could not be carried out until all of the control program was loaded into the personal computer. Accordingly, in order to simultaneously enjoy the picture which is generated in the personal computer and the reproduced sound which is obtained by reproducing the audio signals from the audio disc, it was necessary to wait for a predetermined time which was required to reproduce the recorded control program from the audio disc and load the reproduced control program into the personal computer. This was a disadvantage in that it was impossible to immediately start the reproduction of the audio signals. In addition, the memory capacity of the personal computer had to be large, because the personal computer had to store all of the recorded control program at one time. Moreover, the personal computer did not control the audio disc reproducing apparatus, and there was no control of the interactive mode.

There also was a game apparatus which was designed to play a so-called adventure game, by use of the personal computer and a floppy disc which served as an external memory device. However, such a game apparatus could only reproduce animated cartoon type pictures. Further, it required a memory capacity in the order of 4 kilo-bytes to obtain one still picture. Thus, if a compact type floppy disc which only has one recording side was employed, for example, only 40 still pictures could be reproduced from such a compact floppy disc. In addition to the video signal related to the still picture, it was necessary to store the control program described before.

SUMMARY OF THE INVENTION

Accordingly, it is a general object of the present invention to provide a novel and useful control program signal demodulating device in which the above described problems have been eliminated.

Another and more specific object of the present invention is to provide a control program signal demodulating device which demodulates a control program signal from a signal which is reproduced from a rotary recording medium in a reproducing apparatus, temporarily stores the demodulated control program signal in memory means, and then passes the stored demodulated control program signal through selecting means and interface means and supplies this demodulated control program signal to an external device such as a computer which has a discriminating function and is coupled to the reproducing apparatus. The control program signal demodulating device according to the present invention also decodes control commands which are received from the external device by a command analyser, and generates signals for controlling the operations of the reproducing apparatus or signals requesting transmission with respect to the memory means and the selecting means. The above control program signal includes control commands of the reproducing apparatus which plays the rotary recording medium, and input and output commands and internal processing commands of the external device. The rotary recording medium is recorded with the control program signal, at least together with a video signal.

According to the device of the present invention, the recorded video signal can at least be reproduced from the rotary recording medium, and at the same time, the control program signal can be reproduced from the same track to be successively processed. As a result, it is possible to carry out a reproduction of the so-called interactive format, between the external device which has the discriminating function and the reproducing apparatus which plays the rotary recording medium.

Still another object of the present invention is to provide a control program signal demodulating device which is designed integrally with a player which reproduces recorded signals from a rotary recording medium by a pickup reproducing element, and constitutes a disc reproducing apparatus together with the player. The rotary recording medium is recorded with a video signal and a modulated signal which is time-sequentially (time-divisionally) multiplexed with an audio signal or recorded independently instead of the audio signal, on a spiral track of the rotary recording medium in synchronism with the horizontal synchronizing signal in the video signal. The modulated signal is obtained by modulating a control program signal based on a reference clock signal having a period which is a natural number multiple of the horizontal scanning period of the video signal, and then limiting the band to the band of the audio signal. According to the device of the present invention, it is possible to carry out a reproduction of the so-called interactive format between the disc reproducing apparatus and an external device which has a discriminating function, by coupling the disc reproducing apparatus to the external device. Moreover, it is possible to demodulate the control program signal by use of the reproduced horizontal synchronizing signal. Therefore, it is unnecessary to provide a circuit for reproducing the clock signal, and the circuit construction can consequently be simplified.

A further object of the present invention is to provide a control program signal demodulating device which can demodulate a control program signal in terms of blocks each having a fixed length of approximately one field. According to the device of the present invention, it is possible to forcibly shift a pickup reproducing element (reproducing stylus, for example) from one track to another at a position on a rotary recording medium where the control program signal is not recorded, during a special reproducing mode of a reproducing apparatus which plays the rotary recording medium. Hence, the control program signal can be demodulated in a complete form, and the control program can be decoded by a circuit which has a simple construction compared to a case where the data in the control program signal is of variable length.

Another object of the present invention is to provide a control program signal demodulating device in which, among control commands which are received from an external device which has a discriminating function, a control command which is to be executed so that a reproducing apparatus which plays a rotary recording medium carries out a predetermined operation when an address signal reproduced from the rotary recording medium coincides with a preset value, is stored in advance. According to the device of the present invention, the time lag from the time when the control program signal is reproduced from the rotary recording medium, to the time when the predetermined operation is actually carried out in the reproducing apparatus, can be made small.

Still another object of the present invention is to provide a control program signal demodulating device which demodulates and decodes a control program which is written in an intermediate language having a preset format which is different from the format of the language which is used in an external device which has a discriminating function, and is basically written in direct statements. According to the device of the present invention, it is unnecessary to load the entire control program into the external device by once reproducing the control program signal from a rotary recording medium before starting the actual reproduction of the main information signal from the rotary recording medium, that is, it is possible to reproduce the main information immediately. For this reason, the memory capacity of the external device may be small compared to a case where the entire control program must once be loaded into the external device before starting the actual reproduction of the main information signal. In addition, it is possible to play a rotary recording medium which is recorded with a control program which is written in a predetermined kind of language format, by preparing only one kind of disc language interpreter which is in accordance with the language format of the external device which is used at the time of reproduction. Thus, it is unnecessary to discriminate whether the language format of the control program which is recorded on the rotary recording medium which is to be played, is in conformance with the language format of the external device.

Other objects and further features of the present invention will be apparent from the following detailed description when read in conjunction with the accompanying drawings.

BRIEF DESCRIPTION OF THE DRAWINGS

FIG. 2 shows an example of the constitution of the data in a process of making a control program signal;

FIG. 3 shows an example of the constitution of an essential part of the data shown in FIG. 2;

FIG. 4 shows examples of values of information bits, an error correcting code, and a parity bit in the essential data part shown in FIG. 3;

FIGS. 10(A) through 10(D) respectively are time charts for explaining the operations of another essential part of the block system shown in FIG. 8;

FIG. 11 shows the location of a bit which indicates whether the control program signal is recorded, within a track number address signal;

DETAILED DESCRIPTION

Figure 1:
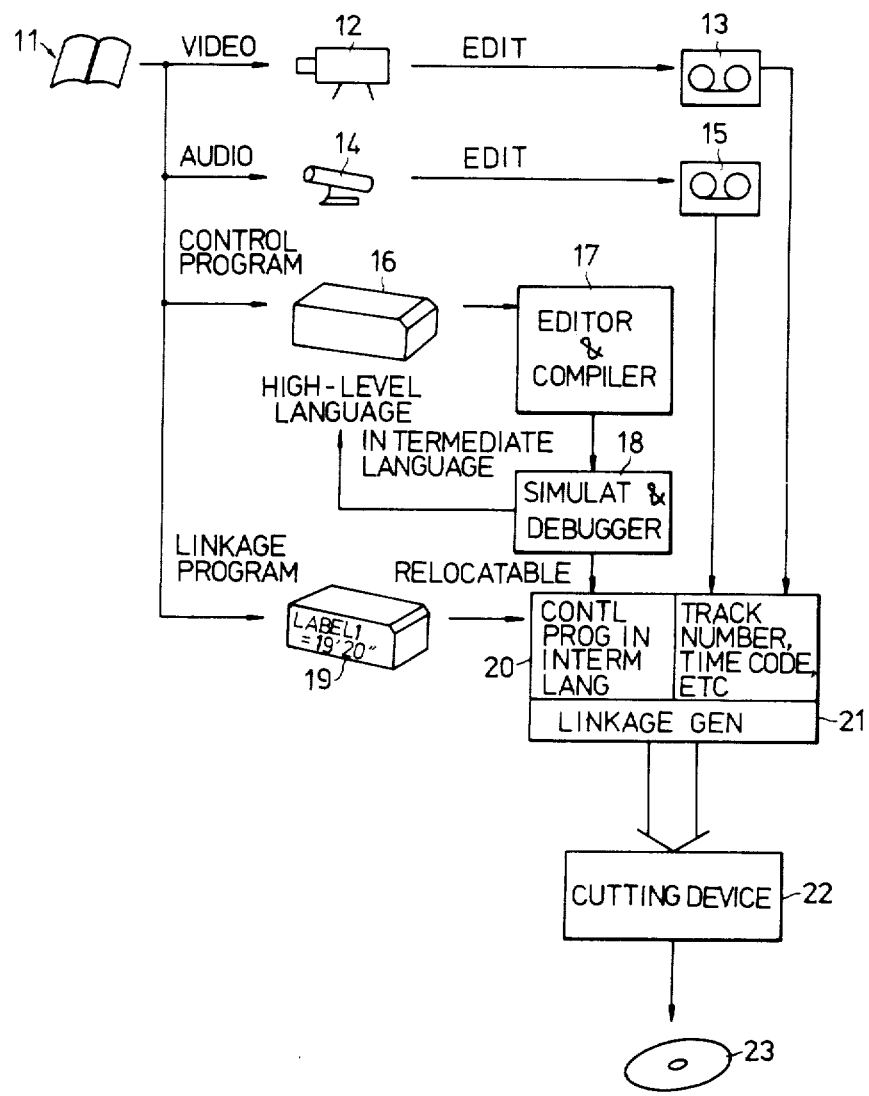
FIG. 1 generally shows an embodiment of a method of making a control program which is to be reproduced and demodulated in a control program signal demodulating device according to the present invention.

In FIG. 1, a picture which is based on a scenario 11 is picked up by a television camera 12. A video signal which is generated from the television camera 12, is edited and then recorded onto a magnetic tape by a video tape recorder (VTR) 13. On the other hand, a voice reading the scenario 11, for example, is picked up by a microphone 14. An audio signal which is generated from the microphone 14, is edited and then recorded onto a magnetic tape in a tape recorder 15. Further, a controlling program 16 which is based on the scenario 11 and is basically written in direct statements (commands) by a high-level language, is made independently of the generation of the video and audio signals. A linkage program is additionally made. When making the controlling program 16, the addressing of jump instructions are performed by labels, and page coordinate instructions (locate instructions and write-pen instructions, for example) are described in percent for the X and Y coordinates. This measure is taken because the size of the screen of the personal computers or the like differ according to the model. By taking this measure, the picture is substantially displayed at an intended position on the screen, regardless of the model of the personal computer.

The controlling program 16 is translated into an intermediate language in an editor and compiler 17. Then, a simulation is carried out based on the controlling program which has been translated into the intermediate language and a detection is carried out to detect an error in the control program, in a simulator and debugger 18. When it is detected in the simulator and debugger 18 that there is an error in the controlling program, the controlling program 16 which is in the high-level language is modified. The modified controlling program is then passed through the editor and compiler 17, and the simulation and debugging are carried out in the simulator and debugger 18. The controlling program which is written in the intermediate language, is made in this manner. The controlling program which is in the intermediate language, is further modified by taking into consideration the interval of labels (the interval between scenes which are to be inserted) and the sequence of the labels by referring to a label table 19, and by taking into consideration the location of subroutine statements. A control program 20 is finally made by inserting the controlling program at predetermined time positions with respect to the video and audio signals which are to be reproduced.

On the other hand, the video signal which is reproduced in the VTR 13 and the audio signal which is reproduced in the tape recorder 15, are subjected to a predetermined signal processing which will be described later on in the specification. In addition to being subjected to the predetermined signal processing, the reproduced video and audio signals are added with an address signal indicating the track number, time code (time address), or the like. Further, the original information data in the control program 20, is subjected to a processing which will be described hereinafter in a block 21.

That is, the block length of the original information data in the control program 20, is set to any one of data block units which is a multiple of 6 bytes. For example, when the block length of the original information data is less than or equal to 6 bytes, the data block unit is set to 6 bytes (48 bits), and when the block length is greater than 6 bytes and less than or equal to 24 bytes, the data block unit is set to 24 bytes. Similarly, when the data block length is greater than 24 bytes and less than or equal to 48 bytes, the data block unit is set to 48 bytes, and when the data block length is greater than 48 bytes and less than or equal to 96 bytes, the data block unit is set to 96 bytes.

The control program 20 is made up from control commands and subcommands (video special effects, for example) of a disc reproducing apparatus which will be described later on in the specification, input and output control commands of an external device such as a personal computer, a game device, or the like which has a discriminating function and is coupled to the disc reproducing apparatus, and internal processing commands (substitute statements, operation statements, random number generating commands, and subroutine stack commands, for example) of the external device. The control program 20 is basically written in direct statements (commands), and the block length is normally less than or equal to 6 bytes, or less than or equal to 24 bytes. However, in the case of string substitutions, data statements, and control programs such as a subroutine stack which need to be stored in an external device, the block length may become greater than 48 bytes. When the data length of the original information data is shorter than the fixed data block length which has been set, dummy data is inserted into the remaining data length. The dummy data is inserted in order to carry out a data rearrangement which will be described later on in the specification.

Next, the above fixed data block length is divided in terms of 6 bytes. A 1-byte information header is added to the beginning of each of the 6-byte data divisions. FIG. 2 shows a 1-byte header HE which is added in the beginning of a 6-byte information data D0 through D5. Then, each of the 7 bytes which are made up from the header HE and the information data D0 through D5, are divided into upper 4 bits and lower 4 bits. A 3-bit error correcting code and a 1-bit parity bit are added subsequent to the upper 4 information bits which are related to the information data in each of the above 7 bytes. Similarly, a 3-bit error correcting code and a 1-bit parity bit are added subsequent to the lower 4 information bits which are related to the information data in each of the above 7 bytes. FIG. 3 shows the data which is made up from upper or lower 4 information bits b1 through b4, the 3-bit error correcting code b5 through b7, and the 1-bit parity bit b8.

Figure 5:
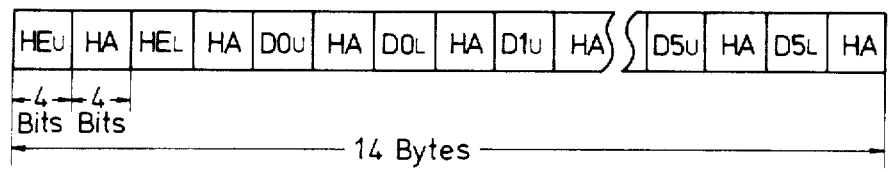
FIG. 5 shows another example of the constitution of the data in the process of making the control program signal.

The values of the bits b1 through b8 shown in FIG. 3, are selected as shown in FIG. 4, for example. Thus, the information data in each of the seven bytes shown in FIG. 2, are added with the 4-bit check bits b5 through b8 with respect to both the upper 4 information bits and the lower 4 information bits thereof as shown in FIG. 3. As a result, the block shown in FIG. 2 is constituted by 14 bytes as shown in FIG. 5. In FIG. 5, the upper 4 bits and lower 4 bits of the header signal HE shown in FIG. 2 are respectively represented by $HE_U$ and $HE_L$. Similarly, a subscript U on the information data D0 through D5 represents the upper 4 information bits of the information data D0 through D5 shown in FIG. 2, and a subscript L on the information data D0 through D5 represents the lower 4 information bits of the information data D0 through D5 shown in FIG. 2. Furthermore, the 4-bit check bits which are made up from the error correcting code and the parity bit, represented by HA in FIG. 5. The 4-bit check bits HA detect the error in the 4-bit information data which is immediately prior thereto, and corrects the error.

Figure 6A:
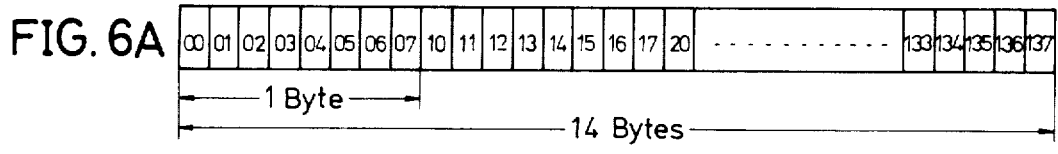
FIGS. 6A and 6B are diagrams for explaining a rearrangement of data, respectively.
Figure 6B:
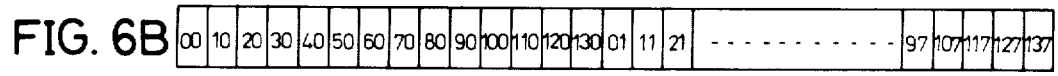
Figure 7:
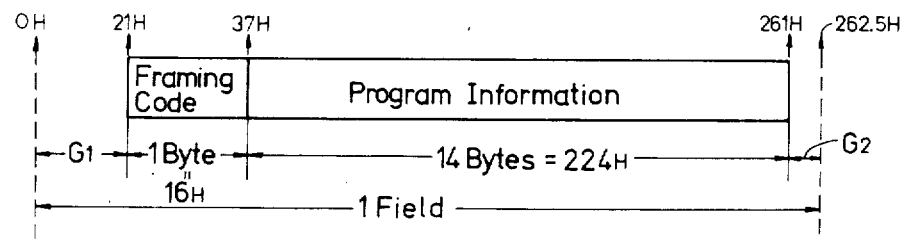
FIG. 7 shows an embodiment of the constitution of the control program signal of a minimum block unit and a transmission period thereof.

Next, the data in the 14 bytes shown in FIG. 5, are rearranged (so-called scrambling or interleaving), in order to minimize the effects of burst error at the time of the reproduction. The 14-byte data shown in FIG. 5 is sectioned in terms of 1 byte. If it is assumed that the data in each of the sectioned bytes are numbered as shown in FIG. 6A, these data are rearranged as shown in FIG. 6B. After this rearrangement of data, a 1-byte framing code is added to the beginning of the 14-byte rearranged data, so as to indicate the beginning of the 14-byte rearranged data. A transmission period in which one bit of a 15-byte control program signal which is made up from the 1-byte framing code and the 14-byte rearranged data, is set to 2H, where H represents one horizontal scanning period. Further, as shown in FIG. 7, when the recorded video signal is of the NTSC system, the above 15-byte control program signal is produced for a duration of 240H from a scanning line number 21H to a scanning line number 260H (a scanning line number 284H to a scanning line number 523H). Moreover, the 15-byte control program signal is modulated by a self-clock modulation system, and is time-sequentially (time-divisionally) multiplexed with the audio signal, for example, and this time-sequentially (time-division) multiplexed signal is recorded onto a disc 23 by a cutting device 22 shown in FIG. 1.

Therefore, the original information data of the control program is divided in terms of 6 bytes, and then formed into the 15-byte control program signal which includes the 1-byte framing code, as described heretofore in conjunction with FIGS. 2 through 7. The 15-byte control program signal shown in FIG. 7 is recorded for a duration of approximately one field, however, the 15-byte control program signal is not transmitted for durations G1 and G2 which total to 22.5H. These durations G1 and G2 are provided so that the 15-byte control program signal can be positively reproduced even when a special reproduction is carried out and a pickup reproducing element of a video disc player which will be described later on in the specification is forcibly shifted from one track turn to another in the vicinity of the scanning line number 11H within the vertical blanking period. In addition, when the original commands in the control program amount to less than or equal to 6 bytes, the same 15-byte control program signal may be repeatedly recorded in one track turn of the disc 23 (repeatedly recorded four times in one track turn, for example). In this case, it becomes possible to reproduce the control program signal even when the pickup reproducing element is forcibly shifted from one track turn to another at an arbitrary position on the one track turn.

Figure 8:
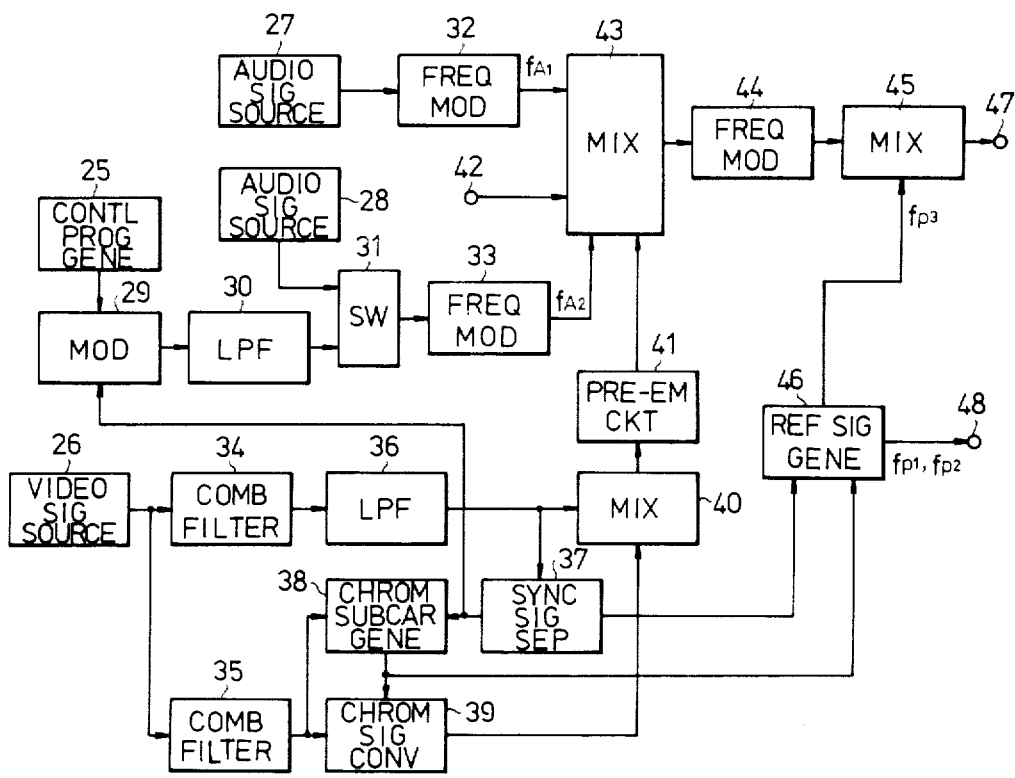
FIG. 8 is a systematic block diagram showing an example of a signal recording system for recording signals onto a rotary recording medium.
Figure 9:
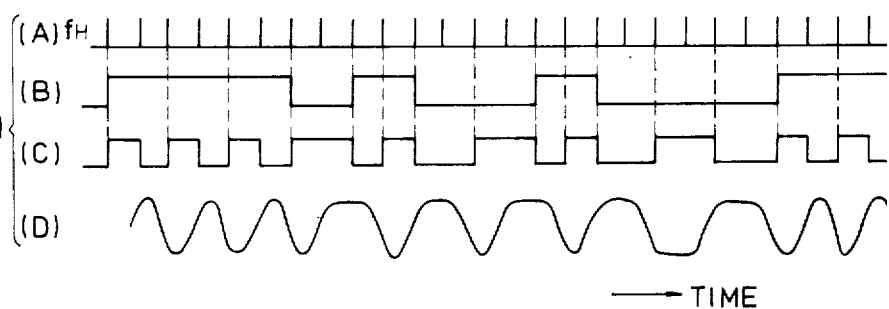
FIGS. 9(A) through 9(D) respectively are time charts for explaining the operations of an essential part of the block system shown in FIG. 8.

Next, a more detailed description will be given with respect to a signal recording system which records the signals onto the disc from which the recorded signal is reproduced and then demodulated according to the present invention. In FIG. 8, a control program generating device 25 generates the control program signal which has been formed by the method described before in conjunction with FIGS. 1 through 7, with a timing shown in FIG. 7. An NTSC system color video signal, for example, is produced from a color video signal source 26. Further, a first-channel audio signal is produced from an audio signal source 27, and a second-channel audio signal is produced from an audio signal source 28. The control program signal which is generated from the control program signal generating device 25, is a Non Return to Zero (NRZ) signal which is unsuited for recording and reproduction in the form as it is. Thus, the control program signal is modulated into a signal shown in FIG. 9(C) by a self-clock modulation system such as a frequency modulation (FM), a biphase-mark modulation, and a biphase-space modulation.

A horizontal synchronizing signal $f_H$ shown in FIG. 9(A) is supplied to a modulator 29 from a synchronizing signal separating circuit 37. The modulator 29 frequency-divides the frequency of the horizontal synchronizing signal $f_H$ by ½, and subjects the control program signal to a biphase-mark modulation by using the frequency divided horizontal synchronizing signal as a reference clock signal. As shown in FIG. 9(C), the modulated signal alternately reverses its state with a period of 1H when the data in the NRZ signal represents a "1", and alternately reverses its state with a period of 2H when the data in the NRZ signal represents a "0". Compared to the NRZ signal, this modulated signal includes less D.C. component and includes more clock signal component, and is therefore suited for recording and reproduction. The modulated signal is band-limited to the band of the audio signal, and is delayed by approximately 1H, in a lowpass filter 30. An output signal of the lowpass filter 30 thus has a substantially sinusoidal waveform, as shown in FIG. 9(D). As clearly seen from FIGS.9(A) and 9(D), the phase of the peak values in the output signal of the lowpass filter 3C, substantially correspond with the phase of the horizontal synchronizing signal $f_H$. Accordingly, in the disc reproducing apparatus which will be described later on in the specification, the data can be demodulated by use of the reproduced horizontal synchronizing signal $f_H$, and it is unnecessary to reproduce the clock signal component from the modulated signal.

The control program signal which is band-limited and delayed in the lowpass filter 30, is supplied to a switching circuit 31. The switching circuit 31 is designed to selectively pass the control program signal. For a duration in which the control program signal is not generated, the switching circuit 31 selectively passes the second-channel audio signal from the audio signal source 28. Hence, the control program signal or the second-channel audio signal is obtained from the switching circuit 31. A time-sequentially (time-division) multiplexed signal containing the control program signal and the second-channel audio signal, is supplied to a frequency modulator 33 from the switching circuit 31. A frequency modulated signal $f_{42}$ in a band of 3.73 MHz±75 kHz, for example, which is frequency-modulated by the above time-sequentially multiplexed signal, is supplied to a mixer 43 from the frequency modulator 33. On the other hand, a frequency modulated signal $f_{41}$ in a band of 3.43 MHz±75 kHz, for example, which is frequency-modulated by the first-channel audio signal, is supplied to the mixer 43 from a frequency modulator 32.

The NTSC system color video signal from the color video signal source 26, is supplied to comb filters 34 and 35. The comb filter 34 performs a comb filter operation in a band of over 2 MHz inclusive, in order to band-share-multiplex a carrier chrominance signal which is converted into a low frequency range of 2.56 MHz. Description on the carrier chrominance signal which is converted into the low frequency range, will be given later on in the specification. A luminance signal which is separated in the comb filter 34, is supplied to a lowpass filter 36. The lowpass filter 36 band-limits the upper limit frequency of the luminance signal to approximately 3 MHz. In addition, a carrier chrominance signal in a band of 3.58 MHz±500 kHz, is obtained from the comb filter 35 and is supplied to a chrominance subcarrier generator 38 and to a chrominance signal converting circuit 39. The chrominance subcarrier generator 38 employs a known method to generate a continuous wave having a frequency which is equal to a chrominance subcarrier frequency $f_{SC}$ (3.579545 MHz in the case of the NTSC system color video signal) of the carrier chrominance signal, from a burst gate pulse and a color burst signal in the carrier chrominance signal. The burst gate pulse is formed from the synchronizing signal which is separated from the output luminance signal of the lowpass filter 36, in the synchronizing signal separating circuit 37. On the other hand, the chrominance signal converting circuit 39 multiplies the frequency of the continuous wave from the chrominance subcarrier generator 38 by 12/7, and subjects this multiplied continuous wave and the incoming carrier chrominance signal to a beat conversion. As a result, a carrier chrominance signal which is converted into a low frequency range and has a chrominance subcarrier frequency of $5f_{SC}/7$, is produced from the chrominance signal converting circuit 39.

The above carrier chrominance signal which is converted into the low frequency range, is mixed with the band limited luminance signal from the lowpass filter 36, in a mixer 40. An output band-share-multiplexed signal of the mixer 40, is subjected to an appropriate pre-emphasis in a pre-emphasis circuit 41, and the pre-emphasized signal is supplied to the mixer 43.

The continuous wave which has the chrominance subcarrier frequency $f_{SC}$ and is obtained from the chrominance subcarrier generator 38, is supplied to a reference signal generating circuit 46 together with the synchronizing signal which is separated in the synchronizing signal separating circuit 37. The reference signal generating circuit 46 generates a burst-form first reference signal fp1 which has a frequency of $f_{SC}/5$ during 4 fields which is equal to one track turn of an original recording disc, and generates a burst-form second reference signal fp2 which has a frequency of $f_{SC}/7$ during subsequent 4 fields. The reference signal generating circuit 46 repeats an operation in which the first and second reference signals fp1 and fp2 are alternately generated through an output terminal 48. Further, the reference signal generating circuit 46 also generates a third reference signal which has a frequency of $f_{SC}/13$, for example, in correspondence with point where the first and second reference signals fp1 and fp2 switch over. The reference signal generating circuit 46 generates the third reference signal fp3 for a duration of approximately 3H, and supplied this third reference signal fp3 to a mixer 45. FIG. 10(A) shows the vertical synchronizing signal and the horizontal synchronizing signal in the vicinity of the vertical blanking period which is separated from the video signal which is to be recorded. As shown in FIG. 10(C), the third reference signal fp3 is generated substantially in correspondence with the vertical synchronizing signal. In addition, the first and second reference signals fp1 and fp2 are generated with a period of 1H, as shown in FIG. 10(D).

FIG. 10(B) indicates that a chapter address signal $A_C$, a time address signal $A_T$, and a track (page) number address signal $A_N$ are respectively transmitted during 1H in the respective scanning line numbers 17H, 18H, and 20H. In the case of an even field, the chapter address signal $A_C$, the time address signal $A_T$, and the track number address signal $A_N$ are respectively transmitted in the scanning line numbers 280H, 281H, and 283H. These address signals are supplied to the mixer 43, through an input terminal 42 shown in FIG. 8. The chapter address signal $A_C$ indicates the recorded position of the signal on the disc in the sequence of the recorded programs. The time address signal $A_T$ indicates the total time. Further, the track number address signal $A_N$ indicates the number of tracks, by using the recorded position of the third reference signal fp3 as a starting point and counting one track turn when the disc undergoes one revolution. The above address signals $A_C$, $A_T$, and $A_N$ are respectively made up from 29 bits.

FIG. 11 shows an example of a signal format of the track number address signal $A_N$. In FIG. 11, a synchronizihg signal 50 of a fixed pattern and having a value "C" in hexadecimal, for example, is located in first through fourth bits which are represented by SYNC. A line discriminating code 51 is located in the 2 bits which are subsequent to the synchronizing signal 50, and an audio discriminating code 52 is located in the 2 bits which are subsequent to the line discriminating code 51. The line discriminating code 51 is used to discriminate the scanning line number which is utilized to transmit the track number address signal, and assumes a value "01", for example. The audio discriminating code 52 is used to discriminate the kind of the recorded audio signal (stereo, monaural, and bilingual, for example). A code which indicates the track number, is located in 20 bits which exist from the ninth through twenty-eighth bits. A 1-bit parity bit 54 located in the last bit. The code which indicates the track number, is made up from five code divisions 53a through 53e each having 4 bits. The 4-bit code divisions 53a through 53e shown in FIG. 11 respectively indicate the value of the ten-thousand's unit, thousand's unit, hundred's unit, ten's unit, and one's unit of the track number in hexadecimal. In the case of a disc which can carry out a recording of up to 60 minutes at the maximum on one side of the disc, the maximum number of tracks on one side of such a disc is 54000. Accordingly, the maximum value of the 4-bit code division 53a is "5" in hexadecimal in this case, and "5" in hexadecimal is "0101" in binary. Therefore, the most significant bit (MSB) of the 4-bit code division 53a, that is, the ninth bit of the track number address signal, will always assume the value "0". The MSB of the 4-bit code division 53a is indicated by hatchings in FIG. 11.

Accordingly, the ninth bit of the track number address signal is utilized to discriminate the existence of the control program signal, that is, to discriminate whether the control program signal is recorded. When the ninth bit of the track number address signal assumes a value "1", it will be assumed that the control program signal is recorded for a duration of 240H from the scanning line number 21H (284H).

The signals which are supplied to the mixer 43 are multipled, and an output multiplexed signal of the mixer 43 is frequency-modulated in a frequency modulator 44 shown in FIG. 8. An output frequency modulated signal of the frequency modulator 44, is supplied to the mixer 45. Hence, a mixed signal which contains the output frequency modulated signal of the frequency modulator 44 and the third reference signal fp3 from the reference signal generating circuit 46, is produced through an output terminal 47.

Figure 12:
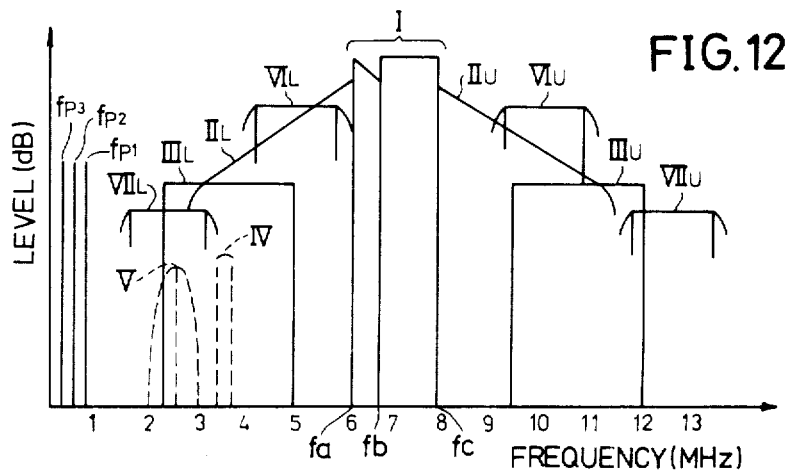
FIG. 12 is a graph showing an example of the frequency spectrum of the signals which are recorded on the rotary recording medium.

FIG. 12 shows an example of a frequency spectrum of the signal which is to be recorded. A band I represents a carrier deviation frequency band of 2.3 MHz of the frequency modulated luminance signal. A frequency $f_a$ represents a frequency of 6.1 MHz which corresponds to the sync tip, a frequency $f_b$ represents a frequency of 6.6 MHz which corresponds to the pedestal, and a frequency $f_c$ represents a frequency of 7.9 MHz which corresponds to the white peak. Bands $II_U$ and $II_L$ respectively represent upper and lower sidebands of the frequency modulated luminance signal, and bands $III_U$ and $III_L$ respectively represent upper and lower sidebands of signals which are obtained by frequency-modulating the frequency modulated signals $f_{A1}$ and $f_{A2}$. Carriers of the frequency modulated signals $f_{A1}$ and $f_{A2}$, which respectively have frequencies of 3.43 MHz and 3.73 MHz, are indicated at IV in FIG. 12. As described before, the control program signal which is subjected to the biphase-mark modulation, is time-sequentially multiplexed with the second-channel audio signal, and this multiplexed signal frequency-modulates the carrier having the frequency of 3.73 MHz so as to obtain the frequency modulated signal $f_{A2}$. Further, the frequency modulated signal $f_{A2}$ frequency-modulates a predetermined carrier. The control program signal is recorded onto the original recording disc, with a signal format in which the control program signal has been subjected to the above time-sequential multiplexing, frequency modulation, and further frequency modulation.

In FIG. 12, a band V represents the band of the carrier chrominance signal which is converted into the low frequency band and obtained from the chrominance signal converting circuit 39. In addition, when the carrier chrominance signal which is converted into the low frequency band is frequency-modulated in the frequency modulator 44, first sidebands $VI_U$ and $VI_L$ and second sidebands $VII_U$ and $VII_L$ are obtained. In FIG. 12, the frequency spectrum which is indicated by the solid line, represents the frequency spectrum of the signal which is recorded onto the original recording disc.

The reference signals fp1, fp2, and fp3 are located in an unused band below the band $VII_L$. The occupying band of the reference signals fp1 through fp3 and the occupying band of the information signal are separated, because these signals must be reproduced by the same pickup reproducing element.

Figure 13:
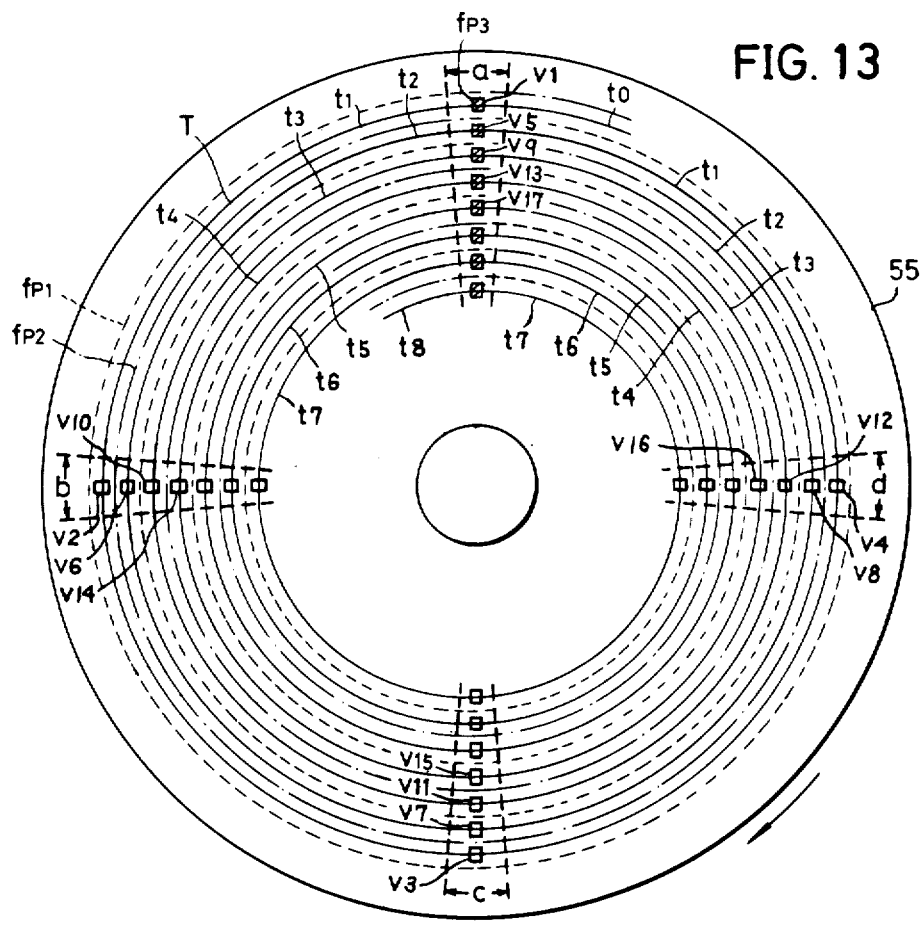
FIG. 13 shows an example of a general track pattern on the rotary recording medium.

The information signal which is obtained through the output terminal 47 shown in FIG. 8 and the reference signals fp1 and fp2 which are obtained through the output terminal 48, are converted into first and second modulated laser beams in a known cutting device which uses the laser beam. These first and second laser beams are simultaneously converged on a photosensitive agent which covers the surface of the original recording disc, in a state where the first and second laser beams are separated from each other by approximately ½ the track pitch. Then, the original recording disc is subjected to a known developing process, and to a known disc producing process. As a result, a disc 55 which is produced, has an electrode function, does not have guide grooves for guiding the pickup reproducing element, and has a track pattern shown in FIG. 13.

The information signal from the output terminal 47 contains the video signal, the audio signal, the address signal, and the control program signal. This information signal is recorded on a spiral track T on the disc 55 shown in FIG. 13, as a frequency modulated signal. The information signal is recorded as row of intermittent pits according to the information content of the information signal. In the single and continuous spiral track T which is indicated by a solid line in FIG. 13, each track turn of the disc 55 is represented by t1, t2, t3, . . . . Each track is formed with pits of the information signal on a flat surface thereof, and no guide groove is formed for guiding the pickup reproducing element.

With respect to one track turn, pits of the first reference signal fp1 and pits of the second reference signal fp2 are respectively formed on both sides thereof along the longitudinal direction of the track for every horizontal scanning period (1H), at positions corresponding to the horizontal blanking period.

Pits of only one of the reference signals fp1 and fp2 are formed at an intermediate position between center lines of adjacent track turns. Moreover, with respect to one track turn, the sides on which the reference signals fp1 and fp2 are recorded, are alternated for each track turn. In other words, the tracks of the first reference signal fp1 are represented by broken lines, and the tracks of the second reference signal fp2 are represented by one-dot chain lines. Positions where the vertical synchronizing signal is recorded in each field, are represented by $V_1$, $V_2$, $V_3$, . . . . Furthermore, the third reference signal fp3 is recorded for a duration of 3H as described before, for example, at the starting positions of the tracks t1, t2, t3, . . . , that is, the positions $V_1$, $V_5$, $V_9$, . . . where the sides on which the reference signals fp1 and fp2 are recorded are interchanged.

In addition, one revolution period of the disc 55 is equal to a duration of 4 fields of the video signal, for example. The vertical blanking period is recorded on the track turns t1, t2, t3, . . . within ranges which are represented by a, b, c, and d.

The control program which is recorded on the disc, is basically written in direct statements. Thus, the data length of the original information data in the control program is normally in the range of 6 bytes, and the control program is formed into the control program signal which has a number of bytes which is in the range of 15 as shown in FIG. 7. This control program signal is recorded for a duration of 240H. However, the second-channel audio signal is recorded in the subsequent track turns. Because the control program is successively recorded on each of the tracks in a distributed manner, the control program is loaded into the personal computer or the like which is used at the time of the reproduction, every time the disc 55 is played. As a result, the memory capacity of the personal computer may be small because there is no need to store the control program once the statements (commands) in the control program have been executed.

The control program is written in a predetermined intermediate language as described before. Hence, as will be described later on in the specification, it is necessary to prepare a disc language interpreter for interpreting the intermediate language into a predetermined language the external device such as the personal computer is designed to understand. The interaction between the disc reproducing apparatus and the external device becomes possible by the use of such a disc language interpreter. In other words, it is necessary to prepare a number of control programs in accordance with the number of kinds of the disc, but by preparing a number of kinds of the disc language interpreters in accordance with the total number of kinds of languages which will be used in the external devices which are anticipated on being used, it is sufficient to prepare only one kind of control program with respect to one kind of disc. Therefore, the burden on the developer of the software is greatly reduced compared to the conventional case described before.

Further, the control program is recorded on the same track as the video signal or the like, by using the transmission path of the second-channel audio signal. Accordingly, with respect to the first-channel audio signal and the video signal, it is possible to reserve a memory capacity which is identical to the memory capacity of the conventional disc which is not recorded with the control program. That is, the recording capacity of the disc is not limited with respect to the first-channel audio signal and the video signal.

Figure 14:
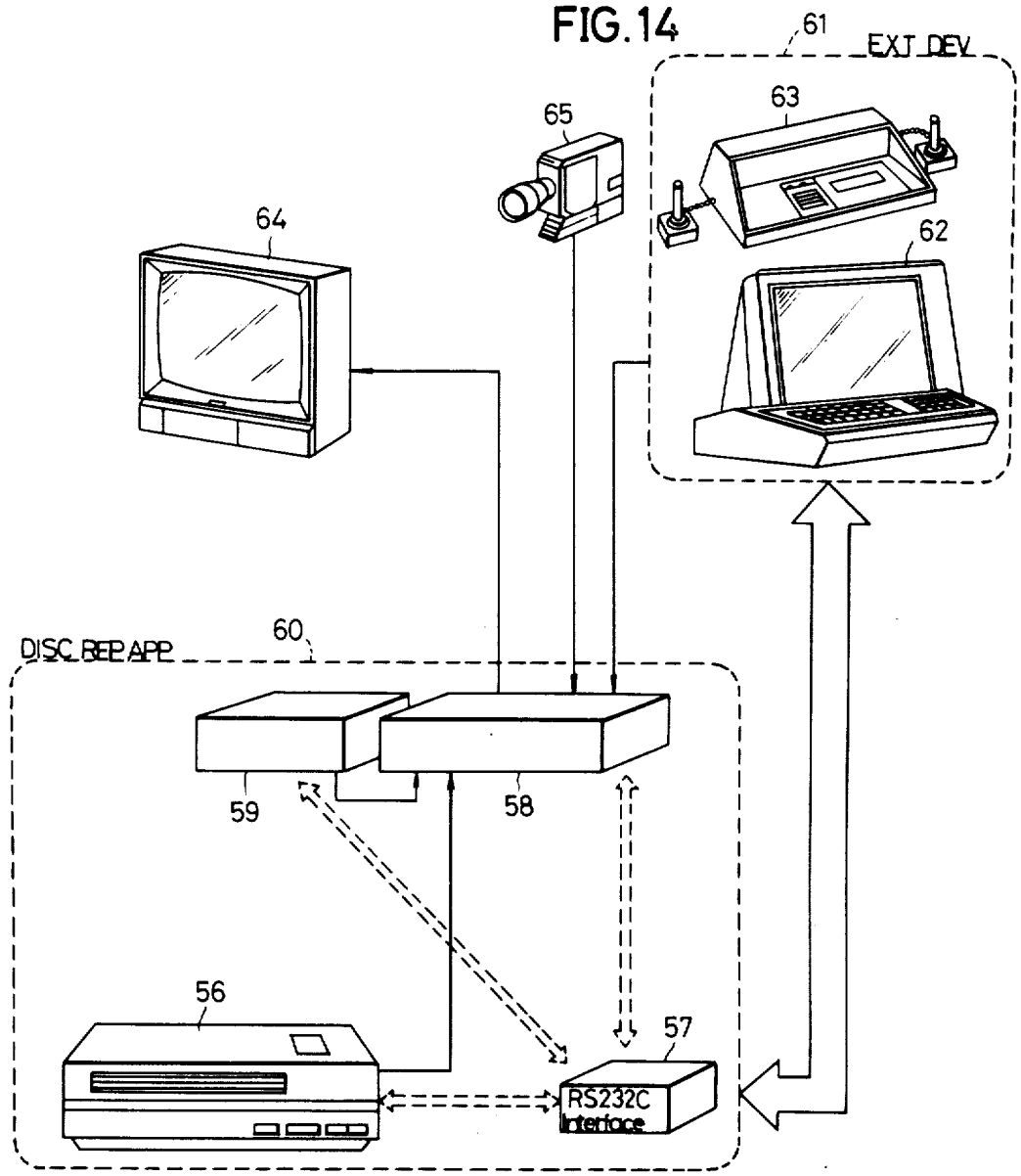
FIG. 14 shows an example of an interconnection between a disc reproducing apparatus which plays the rotary recording medium, and external devices which are connected externally to the disc reproducing apparatus.

Next, description will be given with respect to a control program signal demodulating device according to the present invention which reproduces and demodulates the recorded signals from the disc. In FIG. 14, local commands are transmitted in both directions between a video disc player 56 and an interface box 57 which constitutes the device according to the present invention. The signals which are reproduced from the disc in the video disc player 56, is supplied to a video/audio processor 58 which is used to obtain special effects. In addition, local commands are transmitted in both directions between the interface box 57 and the video/audio processor 58, and between the interface box 57 and a character and audio generator 59. In the present specification, a system which is made up from the video disc player 56, the interface box 57, the video/audio processor 58, and the character and audio generator 59, will be referred to as a disc reproducing apparatus 60. It is not essential to provide the video/audio processor 58 and the character and audio generator 59. Moreover, it will be assumed that the interface box 57 has a standard interface which can transmit bi-directionally, such as an RS232C, for example.

In FIG. 14, various commands based on the control program which is reproduced from the disc, are transmitted in both directions between the interface box 57 within the disc reproducing apparatus 60 and an external device 61 which has a discriminating function. The external device 61 may be devices such as a personal computer and a game device 63. In addition, video and audio signals which are generated from the external device 61, are respectively supplied to a television receiver 64 through the video/audio processor 58. Moreover, the video and audio signals which are obtained in a television camera 65 by picking up an image and sound, are respectively supplied to the television receiver 64 through the video/audio processor 58.

Figure 15:
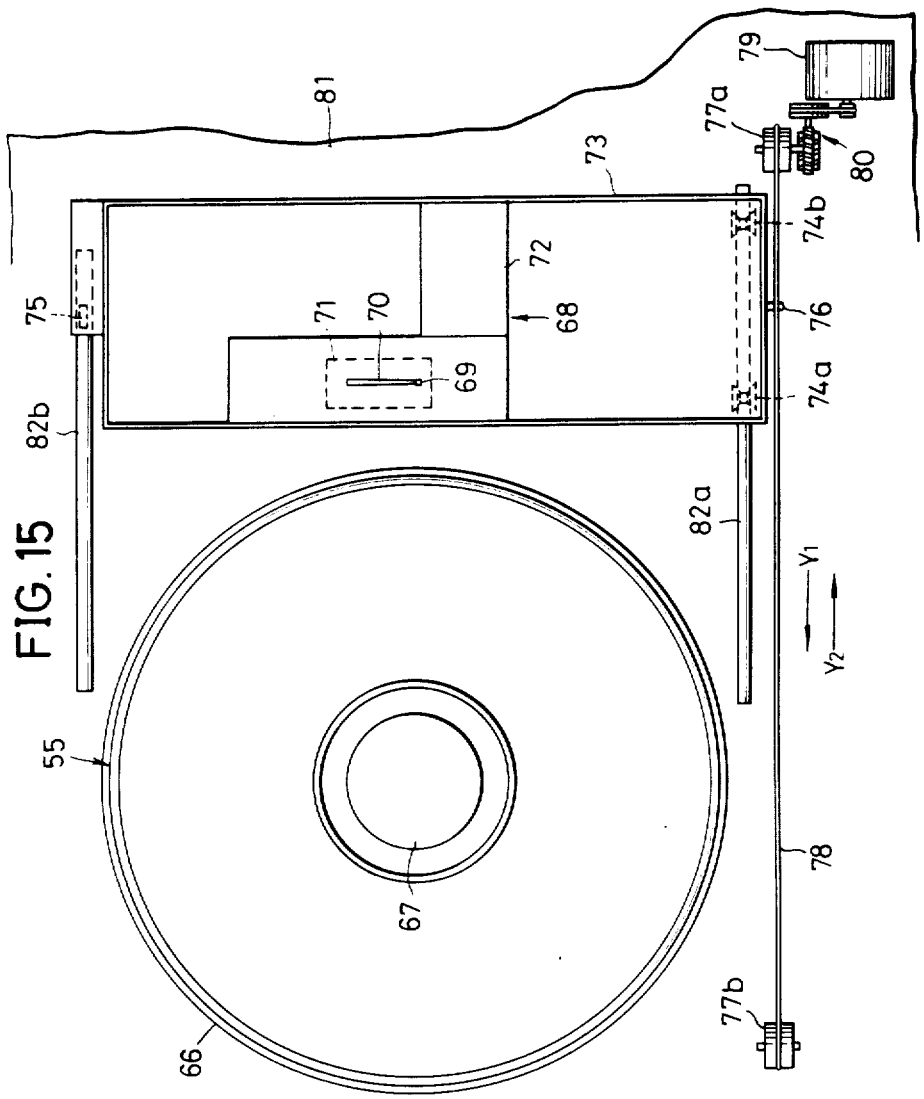
FIG. 15 is a general plan view showing an example of the disc reproducing apparatus.

The video disc player 56 comprises a known signal pickup device, tracking servo circuit, and the like. Description will be given briefly on these constituting elements of the video disc player 56. In FIG. 15, the disc 55 is placed onto a turntable 66 and is clamped by a clamper 67. The disc 55 is rotated clockwise together with the turntable 66, at a predetermined rotational speed. A signal pickup device 68 comprises a cartridge 71, a coaxial resonator 72, and the like, and is mounted on a carriage 73. The cartridge 71 has a cantilever 70 which has a reproducing stylus 69 at a tip end thereof. The carriage 73 has a pair of rollers 74a and 74b on one side flange thereof, and a roller 75 on the other side flange thereof. The rollers 74a and 74b respectively have a groove. A projection 76 on the carriage 73, is secured to a belt 78 which is provided across pulleys 77a and 77b. A feed motor 79 rotates the pulley 77a, by way of a gear mechanism 80As the feed motor 79 rotates, the rollers 74a and 74b respectively roll over a rail 82a which is provided on a chassis 81, while the roller 75 rolls over a rail 82b. Accordingly, the carriage 73 is movable in the directions of arrows Y1 and Y2.

Figure 16:
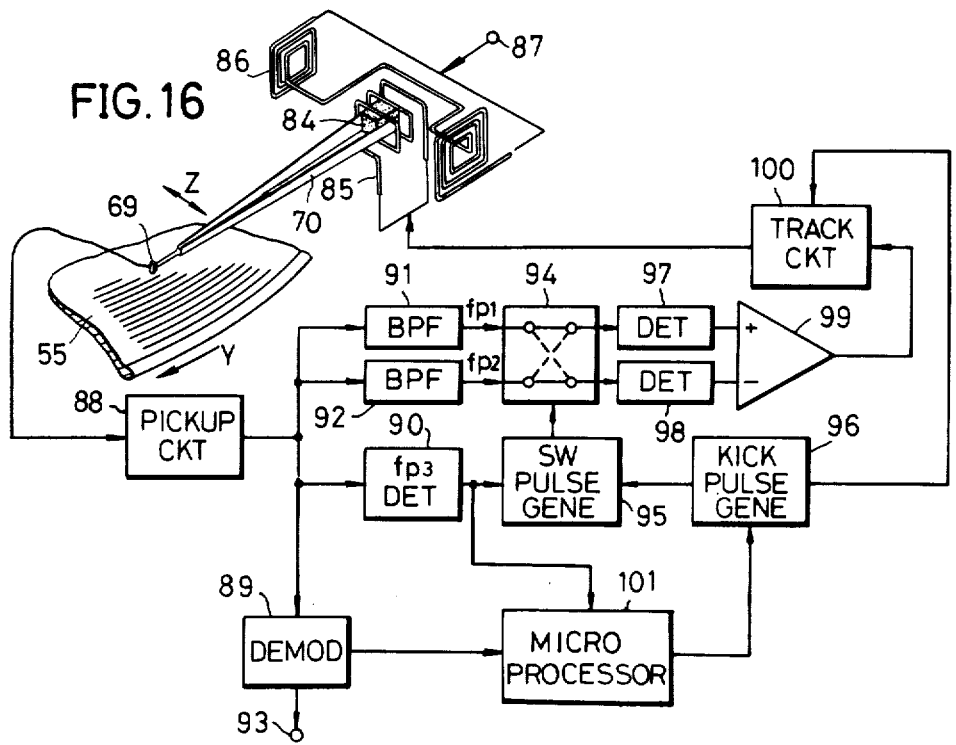
FIG. 16 is a systematic block diagram showing an example of a part of an existing signal reproducing system in the disc reproducing apparatus.

Next, description will be given with respect to a signal demodulating system in the video disc player 56, by referring to FIG. 16. In FIG. 16, those parts which are the same as those corresponding parts in FIG. 15 are designated by the same reference numerals. In FIG. 16, the disc 55 is placed onto a turntable which is rotated by a motor (not shown) Hence, the disc 55 undergoes a synchronous rotation at a high speed, together with the turntable, in the direction of an arrow Y. As the disc 55 is rotated, the reproducing stylus 69 slides and scans over the surface of the disc 55.

The reproducing stylus 55 is fixed to an end of the cantilever 70, and a permanent magnet 84 is fixed to the base at the other end of the cantilever 70. The part where the permanent magnet 84 of the cantilever 70 is fixed, is surrounded by a jitter compensating coil 86 and a tracking coil 85 fixed to the video disc player 56. In the jitter compensating coil 86, right and left coil parts are respectively wound with the same phase. Accordingly, an attractive force or a repulsive force simultaneously acts on the permanent magnet 84 from these coil parts, according to the polarity of a jitter compensation signal which is obtained through an input terminal 87. As a result, the cantilever 70 moves linearly along the tangential direction of the track on the disc 55, and the jitter which is introduced due to eccentricity and surface irregularity or inconsistency of the disc 55 is compensated. In addition, the tracking coil 85 generates a magnetic field along a direction perpendicular to the magnetic field of the permanent magnet 84, and causes the cantilever 70 to move in one direction between directions of an arrow Z (track width direction) according to the polarity of a tracking error signal which is obtained from a tracking circuit 100, by a moving quantity which is in accordance with the magnitude of the tracking error signal.

A pickup circuit 88 comprises a resonant circuit which is varied of the resonance frequency according to the variation in the electrostatic capacitance between an electrode of the reproducing stylus 69 and the disc 55 due to the intermittent rows of pits, a circuit for applying a constant frequency signal to the resonant circuit, a circuit for detecting the amplitude of the high-frequency signal which is obtained from the resonant circuit, and a circuit for preamplifying the above detected high-frequency signal (reproduced signal). The high-frequency reproduced signal obtained from the pickup circuit 88 is supplied to a demodulator 89 wherein the main information signal (the video signal and the audio signal in this case) of the main track is demodulated. The demodulated signal is produced through an output terminal 93. On the other hand, a part of the high-frequency reproduced signal from the pickup circuit 88 is supplied to bandpass filters 91 and 92, and a detector 90. The bandpass filters 91 and 92 respectively have characteristics to frequency-select and amplify only the respective frequencies of the reference signal fp1 and fp2. The reference signals fp1 and fp2 which are respectively obtained from the bandpass filters 91 and 92, are supplied to first and second input terminals of a gate switching circuit 94. The detector 90 frequency-selects the reference signal fp3 and generates an envelope detection signal. The detection 90 self-generates a detection signal which is in phase with the envelope detection signal of the reference signal fp3 which was obtained up to that point, even when the reference signal fp3 is not reproduced due to signal dropout and the like, and this detection signal is supplied to a switching pulse generator 95.

The gate switching circuit 94 is switched by a switching signal from the switching pulse generator 95. For example, during the high-level period of the switching signal, the respective output signals of the bandpass filters 91 and 92 are independently applied to respective input terminals of detectors 97 and 98. On the other hand, during the low-level period of the switching signal, the respective output signals of the bandpass filters 91 and 92 are independently applied to respective input terminals of the detectors 98 and 97.

The polarity of the switching signal from the switching pulse generator 95 is reversed with an incoming detection signal from the detector 90 or a kick pulse (excluding an incoming kick pulse during reproduction of the reference signal fp3) from a kick pulse generator 96. An envelope detection signal of a reference signal which is reproduced from a track on the outer side of the track which is to be reproduced, is thus obtained from the detector 97. Moreover, an envelope detection signal of a reference signal which is reproduced from a track on the inner side of the track which is to be reproduced, is obtained from the detector 98. These output envelope detection signals of the detectors 48 and 49 are respectively supplied to a differential amplifier 99 provided in a subsequent stage of the system. A tracking error signal having a polarity which is in accordance with the direction of the tracking error and having a level (magnitude) which is in accordance with the tracking error quantity, is obtained from the differential amplifier 99. This tracking error signal is supplied to the tracking coil 85 through the tracking circuit 100 wherein the tracking error signal is converted into a predetermined driving voltage, to control the tracking coil 85. Accordingly, the reproducing stylus 69 is moved in the radial direction of the disc 55 with appropriate direction and quantity so that the tracking error becomes zero, and the reproducing stylus 69 accurately scans over the spiral track T on the disc 55.

The main information signal which is demodulated in the demodulator 89, is supplied to a known color video signal reproducing system (not shown) and to a known audio signal reproducing system (not shown), through the output terminal 93. The demodulated main information signal is converted in these systems into a reproduced color video signal of a standard television system and a reproduced audio signal. The reproduced color video signal and the reproduced audio signal are then supplied to a monitoring television receiver (not shown). In addition, the output signal of the demodulator 89 is supplied to a microprocessor 101.

Next, description will be given with respect to each part of a reproducing system which reproduces the control program signal in the disc reproducing apparatus, and each part of a reproducing system which reproduces the control program signal in the external device, in accordance with the processes of the reproducing operations. In the case where the external device 61 is the personal computer 62 which has the construction shown in FIG. 18, for example, the disc language interpreter which is pre-stored in an external memory device such as a cassette tape and a floppy disc, is loaded into the personal computer 62. This disc language interpreter is a routine for interpreting the statements (commands) in the control program which is reproduced from the disc 55, into statements (commands) in a machine language which will be understood by the personal computer 62. Regardless of the kind of the disc 55, it is sufficient to prepare one kind of disc language interpreter with respect to one kind of personal computer. This means that a control program which is reproduced from any kind (information content) of the disc 55, can be decoded in the personal computer 62 by preparing only one kind of external memory device which is pre- stored with a disc language interpreter which is in conformance with the personal computer 62. Furthermore, this means that the control program which is recorded on the disc 55, can be written in one predetermined kind of intermediate language. Accordingly, unlike in the conventional case, it is unnecessary to write the control program in different languages which are employed in the different models of personal computers which are manufactured by different manufacturers. The disc language interpreter is written in a machine language so that the processing can be completed within a short period of time, in view of the limited processing speed of the personal computer 62.

Figure 17:
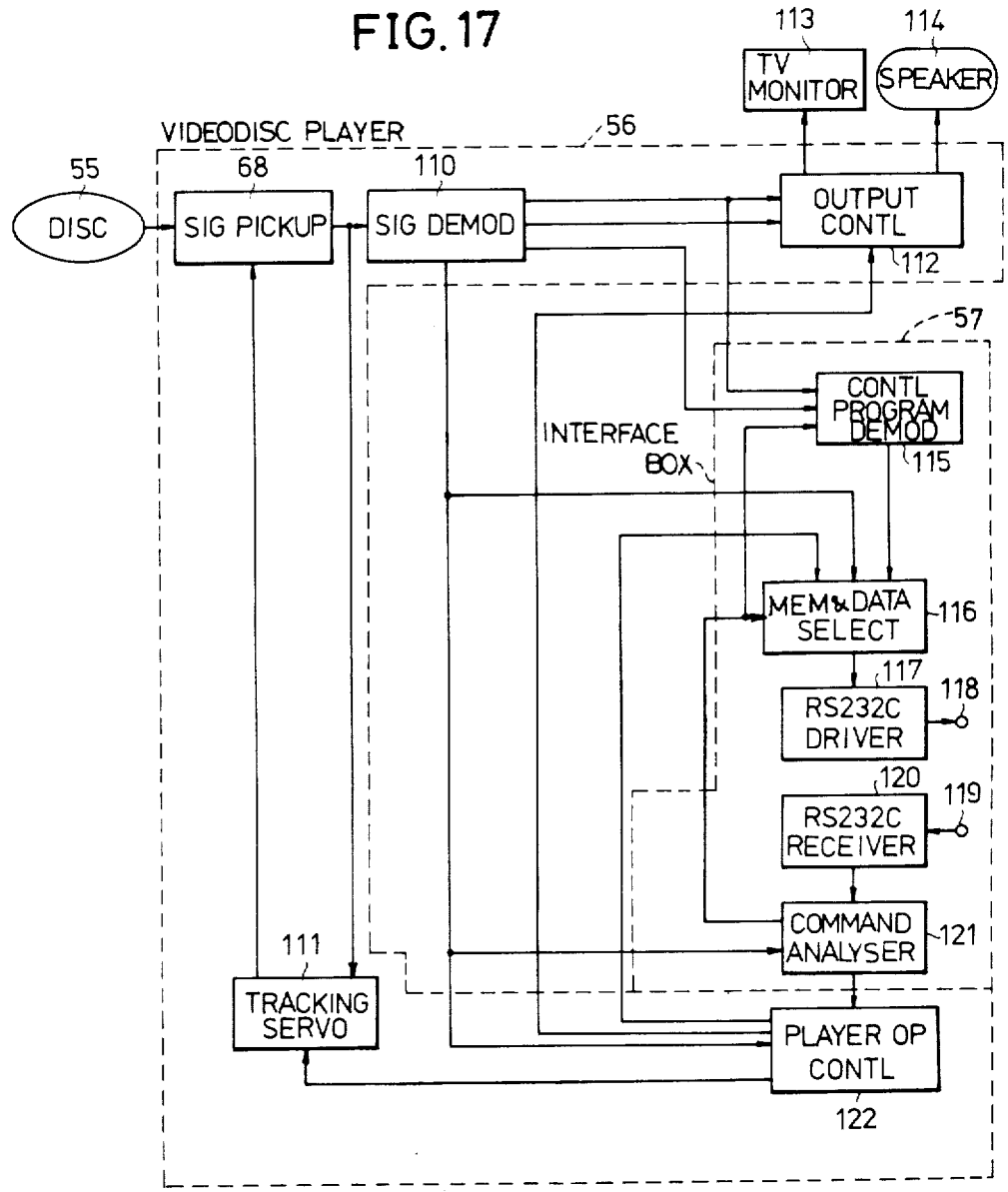
FIG. 17 is a systematic block diagram showing an embodiment of a control program signal demodulating device according to the present invention.

When the operator loads the disc 55 into the video disc player 56 shown in FIG. 17, the video disc player 56 automatically assumes a reproducing mode. Hence, a reproduced signal is obtained from the signal pickup device 68 described before, and this reproduced signal is supplied to a signal demodulator 110 shown in FIG. 17. The signal demodulator 110 is designed to include the demodulator 89 shown in FIG. 16. The tracking error signal is supplied to a tracking servo system 111 which comprises the tracking coil 85 and the like shown in FIG. 16. On the other hand, the reproduced video signal and the reproduced audio signal from the output terminal 93, are respectively supplied to a television monitor 113 and to a speaker 114 under the control of an output controller 112. The reproduced video and audio signals are also supplied to a control program demodulator 115. The modulated signal which has been modulated by the control program signal and is supplied to the control program demodulator 115, and the second-channel audio signal which is supplied to the output controller 112, are selectively produced from a circuit within the signal demodulator 110. This circuit within the signal demodulator 110, is shown in FIG. 19.

Figure 19:
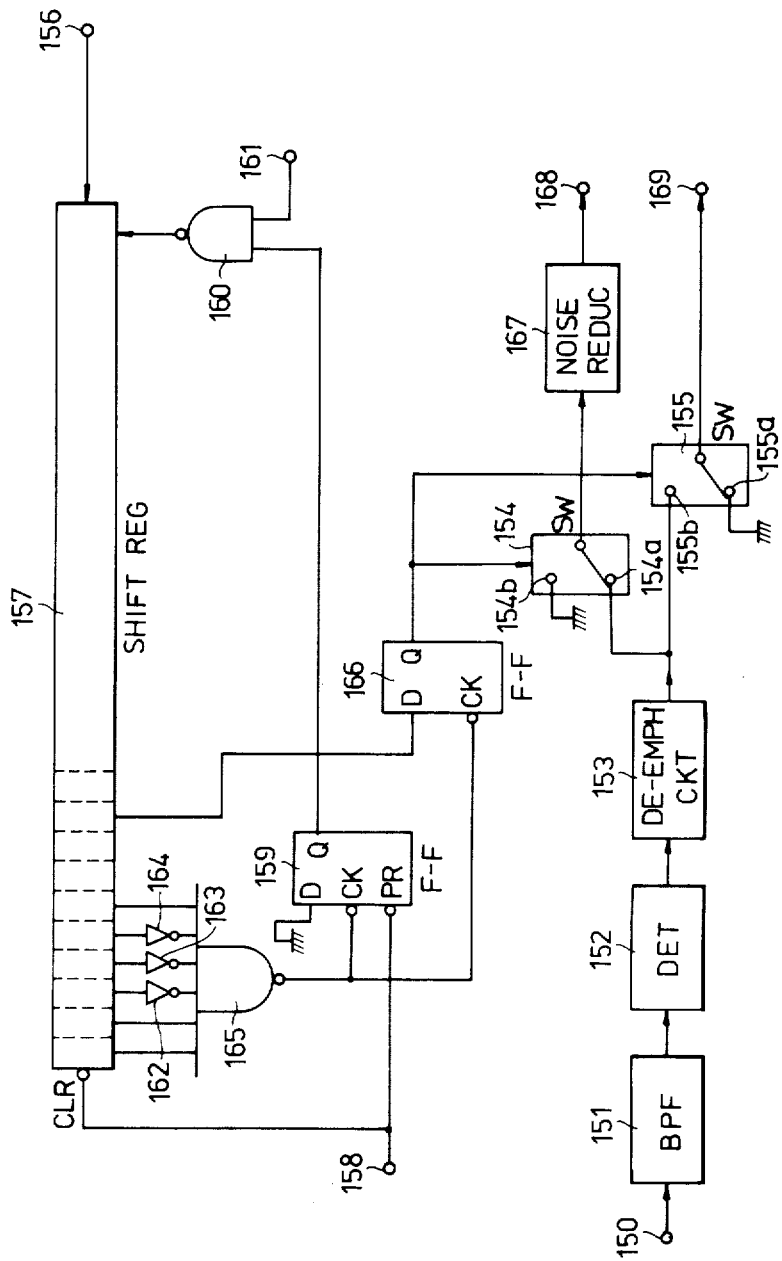
FIG. 19 is a systematic circuit diagram showing an embodiment of an essential part of the block system shown in FIG. 17.

In FIG. 19, the reproduced signal from the output terminal 93 is applied to an input terminal 150. The signal from the input terminal 150 is supplied to a bandpass filter 151 wherein the frequency modulated signal $f_{A2}$ is frequency-selected, and an output signal of the bandpass filter 151 is subjected to an FM detection in a detecting circuit 152. The modulated signal which has been subjected to the biphase-mark modulation by the control program signal, or the second-channel audio signal, is produced from the detecting circuit 152. This output signal of the detecting circuit 152 is passed through a de-emphasis circuit 153, and is then supplied to a terminal 154a of a switching circuit 154 and to a terminal 155b of a switching circuit 155.

On the other hand, the address signals $A_C$, $A_T$, and $A_N$ which have been multiplexed in the vertical blanking period of the video signal within the reproduced signal which is obtained from the output terminal 93, are separated and supplied to a 29-bit shift register 157 through an input terminal 156. The reproduced vertical synchronizing signal is applied to an input terminal 158. This reproduced vertical synchronizing signal clears the shift register 157 and simultaneously presets a delay type (D-type) flip-flop 159 by a leading edge thereof. Accordingly, a Q-output of the flip-flop 159 assumes a high level, and this high-level Q-output opens the gate of a NAND circuit 160. As a result, the clock signal component in the reproduced address signal which is applied to an input terminal 161, begins to be applied to the shift register 157 as a shift pulse, through the NAND circuit 160, from the time when the leading edge of the reproduced vertical synchronizing signal is received. Therefore, the reproduced address signal which is applied to the input terminal 156, is successively shifted to the left within the shift register 157 shown in FIG. 19.

The first, second, and sixth bits of the shift register 157, are directly supplied to a NAND circuit 165. On the other hand, the third, fourth, and fifth bits of the shift register 157 are respectively supplied to the NAND circuit 165, through inverters 162, 163, and 164. The synchronizing signals in each of the address signals $A_C$, $A_T$, and $A_N$ respectively assume a common value "C" in hexadecimal. However, the 2-bit line discriminating codes subsequent to the respective synchronizing signals, differ for each of the address signals $A_C$, $A_T$, and $A_N$. For example, the line discriminating code 51 of the address signal $A_N$ is "01". Accordingly, a low-level detection signal is produced from the NAND circuit 165, only when all of the 29-bit address signal $A_N$ has been loaded into the shift register 157. This detection signal from the NAND circuit 165 is supplied to respective clock input terminals $C_K$ of D-type flip-flops 159 and 166. A data input terminal of the flip-flop 159 is grounded. On the other hand, the ninth bit of the shift register is supplied to a data input terminal of the flip-flop 166. Hence, the Q-output of the flip-flop 159 assumes a low level from a point when the above detection signal is produced from the NAND circuit 165. This low-level Q-output of the flip-flop 159 is supplied to the NAND circuit 160 and closes the gate of the NAND circuit 160, so as to block the supply of the shift pulse to the shift register 157. At the same time, the data in the ninth bit of the reproduced address signal $A_N$ is produced through a Q-output of the flip-flop 166. This Q-output of the flip-flop 166 is applied to the switching circuits 154 and 155 as a switching signal.

As described before in conjunction with FIG. 11, the ninth bit of the address signal $A_N$ contains the discriminating signal which indicates the existence of the control program signal. When the ninth bit of the address signal $A_N$ assumes a value "1", it is indicated that there is a recorded control program signal. Accordingly, when the Q-output of the flip-flop 166 assumes a low level (value "0"), the moving contacts of the switching circuits 154 and 155 are respectively connected to the terminals 154a and 155a. On the other hand, the moving contacts of the switching circuits 154 and 155 are respectively connected to the terminals 154b and 155b when the Q-output of the flip-flop 166 assumes a high level (value "1"). Thus, when the reproduced second-channel audio signal is obtained from the de-emphasis circuit 153, this reproduced audio signal is passed through the switching circuit 154, and is then supplied to a noise reducing circuit 167 wherein a known signal processing carried out in order to reduce the noise. An output signal of the noise reducing circuit 167 is obtained through an output terminal 168. On the other hand, when the modulated signal which has been modulated by the control program signal is obtained from the de-emphasis circuit 153, this reproduced modulated signal is passed through the switching circuit, and produced through an output terminal 169.

Figure 20A:
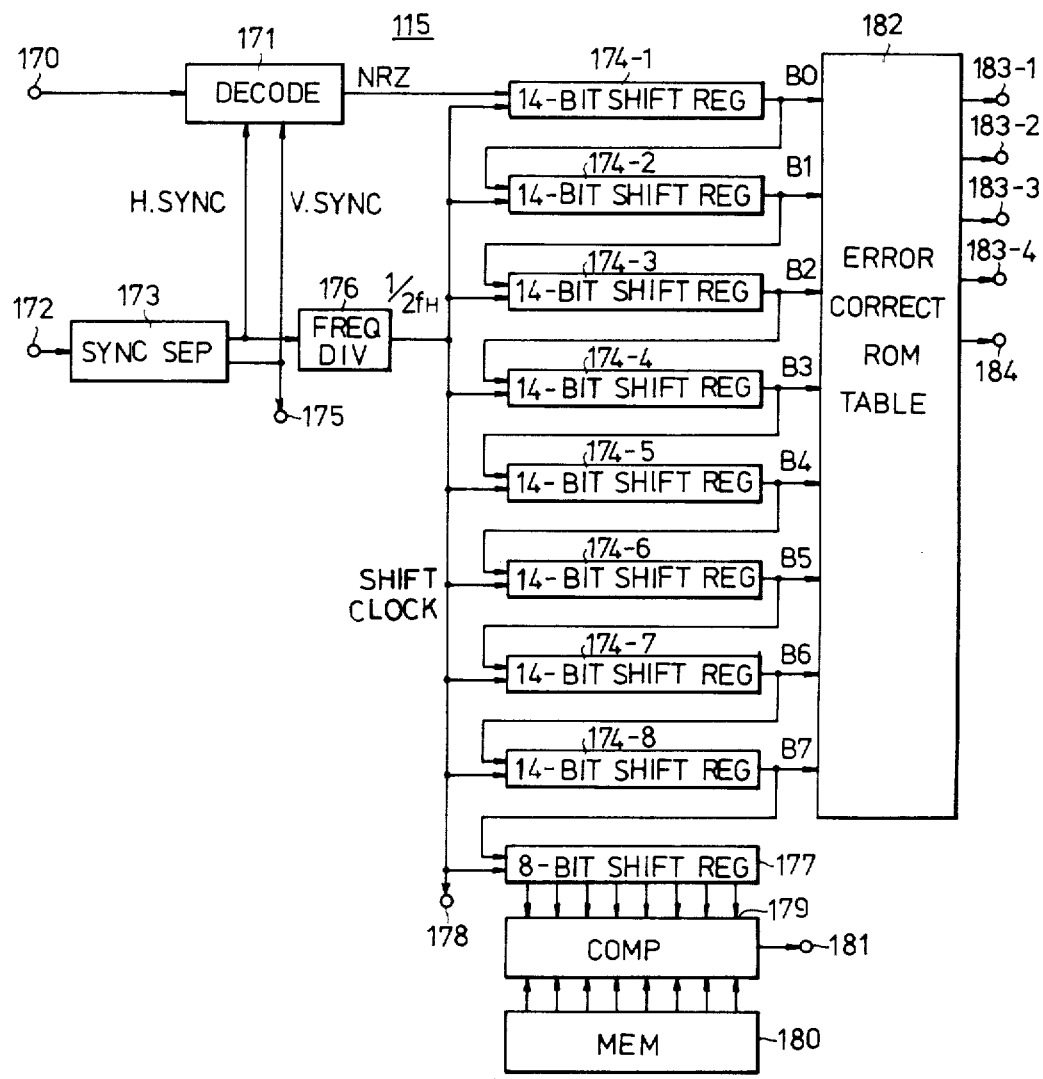
FIGS. 20A and 20B are systematic block diagrams respectively showing an embodiment of another essential part of the block system shown in FIG. 17.

As shown in FIG. 17, the reproduced modulated signal which is obtained through the output terminal 168, is supplied to the control program demodulator 115 within the interface box 57 together with the reproduced video signal which is obtained from the signal demodulator 110. The control program demodulator 115 has a construction shown in FIG. 20A, and description will hereinafter be given with respect to the construction of the control program demodulator 115. In FIG. 20A, the above reproduced modulated signal is applied to an input terminal 170, and is then supplied to a decoder 171 wherein the reproduced modulated signal is demodulated into a reproduced control program signal. The decoder 171 is also supplied with a reproduced vertical synchronizing signal and a reproduced horizontal synchronizing signal. These reproduced vertical and horizontal synchronizing signals are separated in a synchronizing signal separating circuit 173, from the reproduced composite color video signal which is supplied to the synchronizing signal separating circuit 173 through an input terminal 172.

Figure 21:
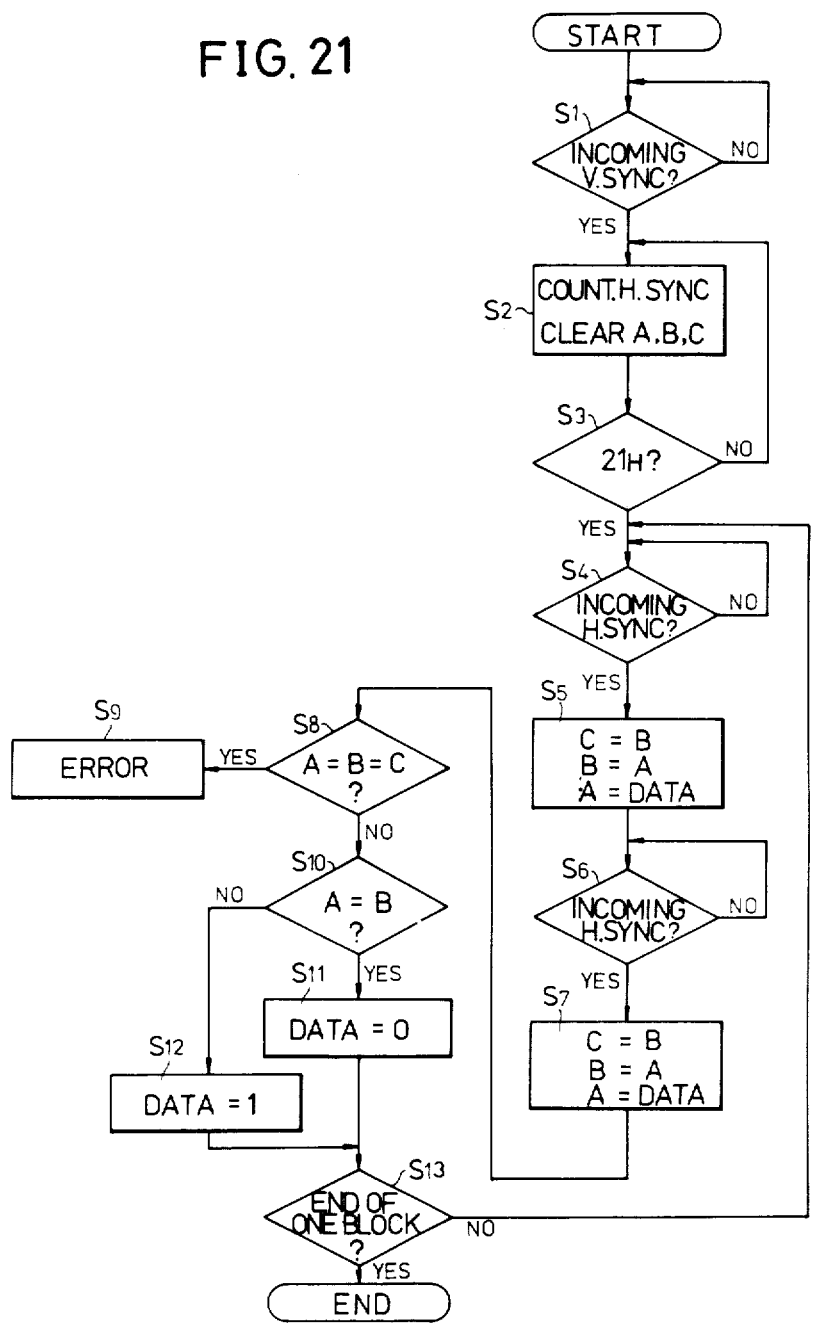
FIG. 21 is a flowchart for explaining the operations of a microprocessor when a decoder shown in FIG. 17 is constituted by the microprocessor.

The decoder 171 may be constituted from a microprocessor, or from a digital circuit. In a case where the decoder 171 is constituted from a microprocessor, the decoder 171 operates according to a flowchart shown in FIG. 21. In other words, the existence of the vertical synchronizing signal is detected in a step S1. When there is an incoming vertical synchronizing signal, variables A, B, and C are respectively cleared, and at the same time, the horizontal synchronizing signal is counted in a step S2. Then, the scanning line number 21H (284H) is detected in a step S3. The scanning line number 21H (284H) is detected, because the control program signal which is made up from a total of 15 bytes is recorded from the scanning line number 21H (284H) as described before.

Next, a step S4 detects an incoming horizontal synchronizing signal. A step S5 sets the variables C=B and B=A, and sets the variable A to the value ("0" or "1") of the data in the scanning line number 21H (284H). Then, a step S6 detects whether there is again an incoming horizontal synchronizing signal. When there is again an incoming horizontal synchronizing signal, a step S7 sets the variables C=B and B=A, and sets the variable A to the value of the data in the scanning line number 22H (285H). The data in the reproduced control program signal is a square wave which is obtained by waveform-shaping the signal shown in FIG. 9 (D). The logic level "0" or "1" of the data in the reproduced control program signal is in phase with the reproduced horizontal synchronizing signal. Three continuous sampling outputs which are obtained in correspondence with the phase of the horizontal synchronizing signal, will not assume the same value. When two continuous sampling outputs which are sampled with the horizontal scanning period assume the same value, the logic level "0" is indicated. On the other hand, when these two continuous sampling outputs assume different values, the logic level "1" is indicated. This should be clear from FIGS. 9(A) and 9(D).

The decoder 171 discriminates whether the values of the variables A, B, and C are the same, in a step S8. When the values of the variables A, B, and C are the same, a step S9 discriminates that there is an error. On the other hand, when the values of the variables A, B, and C are not the same, a step S10 discriminates whether the values of the variables A and B coincide. When the values of the variables A and B coincide, a step S11 detects that the data is "0". A step S12 detects that the data is "1" when the values of the variables A and B do not coincide. Thereafter, an operation similar to the operation described heretofore is repeated, until a step S13 detects the end of one block.

Figure 22:
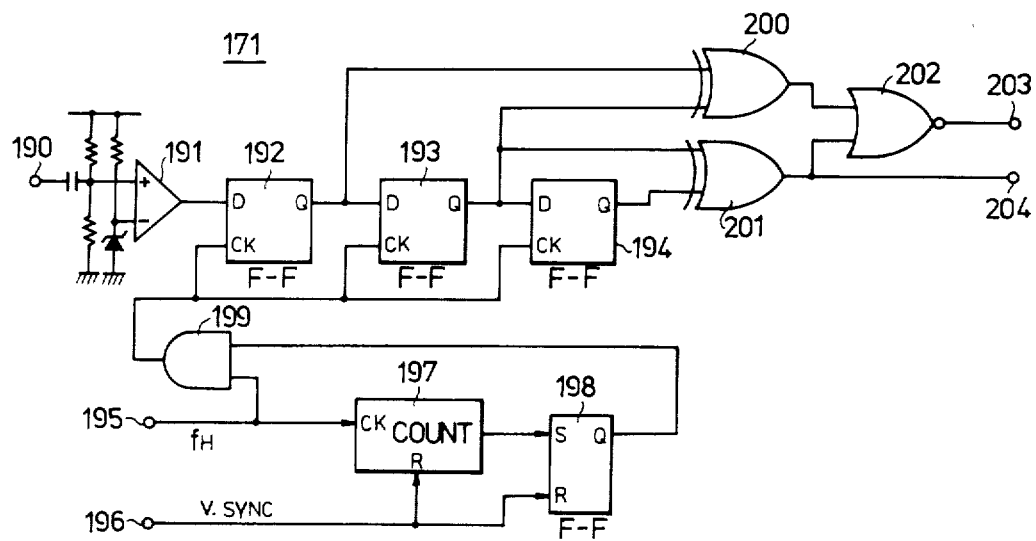
FIG. 22 is a circuit diagram showing an example of the decoder shown in FIG. 17 when the decoder is made up from a digital circuit.

The decoder 171 which carries out the operation described above, may be constituted by a digital circuit shown in FIG. 22. In FIG. 22, a modulated signal which has been subjected to a self-clock modulation by the control program signal which is reproduced from the disc 55, is applied to an input terminal 190. This modulated signal is subjected to a waveform-shaping in a comparator 191, and is then applied to a data input terminal of a D-type flip-flop 192. Flip-flops 192, 193, and 194 are connected in series in three stages. The reproduced horizontal synchronizing signal is applied to an input terminal 195, and is counted in a counter 197. The counter 197 is reset in response to the reproduced vertical synchronizing signal which is applied to an input terminal 196, and produces an output signal at the scanning line number 21H (284H). This output signal of the counter 197 sets a flip-flop 198, and opens the gate of an AND circuit 199. In addition, the flip-flop 198 is reset in response to the vertical synchronizing signal. Accordingly, the reproduced horizontal synchronizing signal is applied to clock terminals of the flip-flops 192 through 194 as a clock pulse, from the time when the scanning line number 21H (284H) is obtained to the time when the vertical synchronizing signal is obtained. As a result, when the sampling outputs during 3H assume the same value, an error signal is produced through an exclusive-OR circuit 200, a NOR circuit 202, and an output terminal 203. When the sampling outputs assume the same value during 2H, a signal which indicates that the data is "0", is produced through an exclusive-OR circuit 201 and an output terminal 204. Further, when the sampling outputs assume different values during 2H, a signal which indicates that the data is "1", is produced through the output terminal 204.

Returning again to FIG. 20A, the reproduced control program signal (data) which is obtained through the decoder 171, is an NRZ signal. This NRZ signal is successively supplied to eight 14-bit shift registers 174-1 through 174-8 which are connected in series. On the other hand, the reproduced vertical synchronizing signal which is obtained from the synchronizing signal separating circuit 173, is produced through an output terminal 175. The reproduced horizontal synchronizing signal which is obtained from the synchronizing signal separating circuit 173, is frequency-divided by ½ in a frequency divider 176. An output frequency divided signal of this frequency divider 176, is supplied in parallel to the shift registers 174-1 through 174-8, as a shift clock signal. This output signal of the frequency divider 176 is also supplied to an 8-bit shift register 177. The shift registers 174-1 through 174-8 constitute a circuit part which carries out an operation to rearrange the scrambled data which was described in conjunction with FIGS. 6A and 6B, back into the original sequence. 1-bit data B0 through B7 are respectively produced from the shift registers 174-1 through 174-8, and are supplied in parallel to an error correcting ROM table 182. The data which is obtained from the shift register 174-8 which is provided in the final stage of the eight series-connected shift registers 174-1 through 174-8, is supplied to the 8-bit shift register 177 wherein the data is subjected to a serial-to-parallel conversion. An output of this shift register 177 is supplied to a comparator 179. The comparator 179 compares the data from the shift register 177, with a predetermined framing code pattern which is pre-stored in a memory 180. When the two 8-bit signals in the comparator 179 coincide, it is detected that the framing code shown in FIG. 7 has been reproduced, and the comparator 179 produces a framing code detection signal. This framing code detection signal is supplied to a memory address generator 185 shown in FIG. 20, through an output terminal 181.

The error correcting ROM table 182 is employed to detect and correct the error in the 8-bit data supplied thereto by a known method, by use of the check bits b5 through b8 shown in FIG. 4. The 4-bit information data which has been corrected of the error, is produced in parallel through terminals 183-1 through 183-4. When the error correction cannot be carried out, an error detection data is produced through a terminal 184.

Figure 20B:
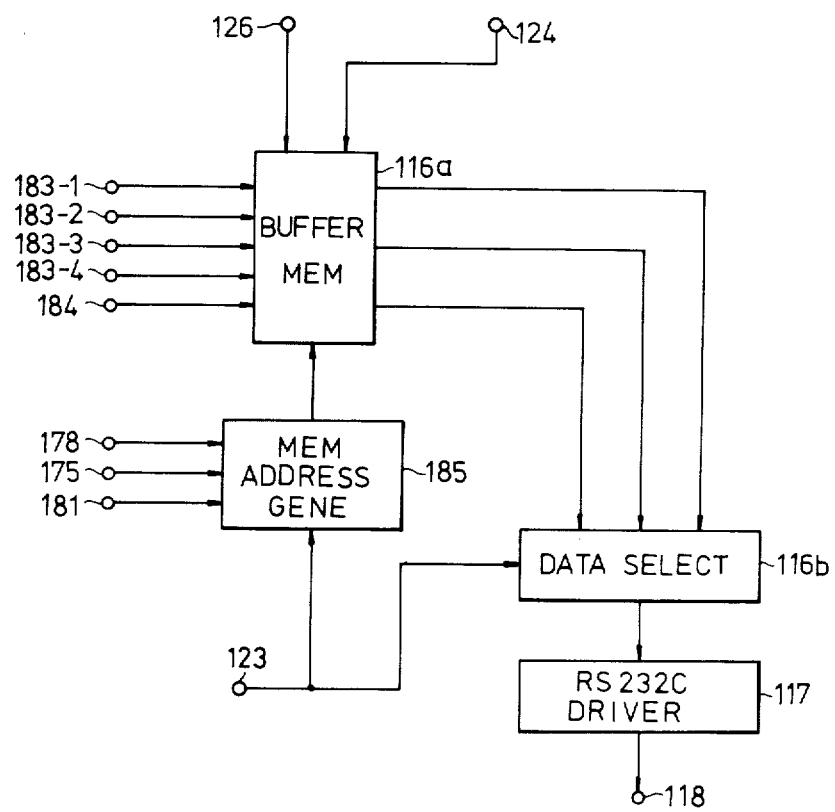

These output data from the error correcting ROM table 182, is supplied to a buffer memory and data selector 116 shown in FIG. 17, as the output data of the control program demodulator 115. FIG. 20B is a systematic block diagram showing the construction of the buffer memory and data selector 116 is more detail. In FIG. 20B, those parts which are the same as those corresponding parts in FIGS. 17 and 20A are designated by the same reference numerals. In FIG. 20B, the data which are produced through the terminals 183-1 through 183-4 and 184, are supplied to a buffer memory 116a. On the other hand, the reproduced vertical synchronizing signal, the signal which is obtained by frequency-dividing the horizontal scanning frequency $f_H$ by $\frac{1}{2}$, the framing code detection signal, and a transmission request signal which is obtained through a terminal 123, are respectively supplied to the memory address generator 185 through the respective terminals 175, 178, and 181. When the framing code detection signal is supplied to the memory address signal generator 185 through the terminal 181, the 4-bit data from the terminals 183-a through 183-4 is valid. Thus, in this case, the memory address signal generator 185 supplies an address signal which indicates an allocated address to the buffer memory 116a, so that the 4-bit data is stored in the allocated address of the buffer memory 116a. The value of the address signal changes for every H/2. Further, a status which is produced from a player operation controller 122 within the video disc player 56 shown in FIG. 17 and obtained through a terminal 124, and a reproduced address data (disc address) of the address signals $A_T$, $A_N$, and $A_C$ produced from the signal demodulator 110 and obtained through a terminal 126, are temporarily stored in the buffer memory 116a so that the status and the disc address can be transmitted at a predetermined transmission rate. For example, the status comprises 25 bits, and indicates the content of the recorded information signal (that is, the television system of the video signal, the kind of audio signal, and the like), the side of the disc which is being played, the display mode, the positional information of the reproducing stylus, the playing mode, and the like.

The control program signal data, the status, and the disc address which are stored in the buffer memory 116a, are respectively read out from the buffer memory 116a and supplied to a data selector 116b. The data selector 116b selectively passes one kind of data, according to a transmission request signal from a command analyser 121 which will be described later on in the specification. The data which is selectively passed through the data selector 116b, is passed through an RS232C driver 117 shown in FIGS. 17 and 20B. An output of the RS232C driver 117 is supplied to an input terminal 129 of the personal computer 62 shown in FIG. 18, through an output terminal 118. The command analyser 121 produces a transmission request and supplies this transmission request to the data selector 116b so that the control program which is stored in the buffer memory 116a is successively supplied to the personal computer 62 from the data selector 116b, unless a command which prohibits such an operation is supplied to the command analyser 121.

Figure 23:
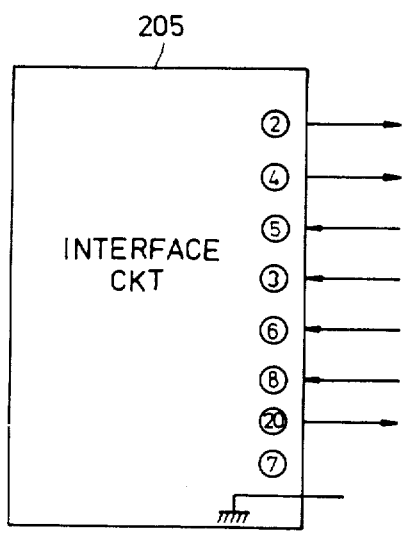
FIG. 23 is a diagram for explaining input signals to and output signals from pins located at an essential part of an RS232C interface circuit.

As is well known, the RC232C interface is a standard which was decided by U.S. Electronics Industry Association (EIA) at the recommendation of the International Consultative Committee for Telephone and Telegraph (CCITT). In the present embodiment, the RS232C driver 117 and an RS232C receiver 120, constitute an RS232C interface circuit 205 shown in FIG. 23. Among the 25 pins of this interface circuit 205, the following signals are applied to or produced from the second, third, fourth, fifth, sixth, seventh, eighth, and twentieth pins which are represented by ②, ③, ④, ⑤, ⑥, ⑦, ⑧, and ⑳ . The reproduced data and an address information which is related to the internal state of the video disc player 56, are respectively produced through the second pin and supplied to the external device 61. Further, a control command with respect to the video disc player 56, is applied to the third pin from the external device 61. The signals which are produced from the fourth, fifth, sixth, seventh, eighth, and twentieth pins, are originally used to control the modem or discriminate the state of the modem. However, in the present embodiment, the signals from the fourth and fifth pins are used to control the transmitting operation of the video disc player 56 with respect to the external device 61. A request to start a transmission from the video disc player 56 to the external device 61, is made with respect to the video disc player 56 when the signal from the fourth pin assumes a positive polarity. When the external device 61 is in a state possible to receive the transmission, the polarity of the signal from the fifth pin is made positive with respect to the video disc player 56. When these two conditions have been satisfied, a transmission is made from the video disc player 56 to the external device 61 by use of the second pin.

The signals from the sixth, eighth, and twentieth pins are used to control the receiving operation of the video disc player 56. When the video disc player 56 is in a state possible for reception, the polarity of the signal from the twentieth pin is made positive. Further, when the external device 61 is in a state possible for transmission, the polarity of the signals from the sixth and eighth pins is made positive. When these two conditions are satisfied, a control command is transmitted to the video disc player 56 from the external device 61, by use of the third pin. The seventh pin is grounded.

Figure 18:
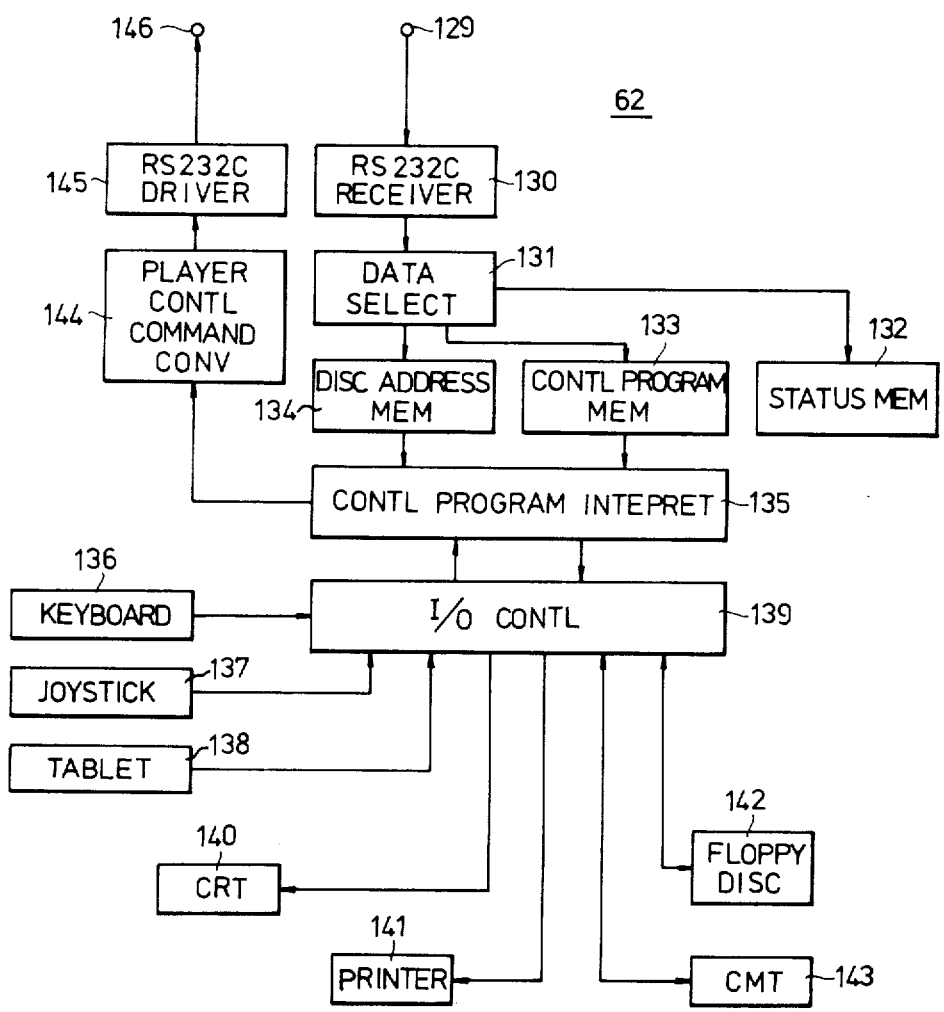
FIG. 18 is a systematic block diagram showing an example of a personal computer which is connected to the device according to the present invention.

The data which is received by an RS232C receiver 130 shown in FIG. 18, which is located within the personal computer 62 which is used as an example of the external device 61, is supplied to a data selector 131. The signals which are supplied to the data selector 131, are respectively added with the 1-byte header signal. Thus, the data selector 131 uses this header signal to discriminate the kind of input data, and selectively supplies the input data to a predetermined memory among a status memory 132, a control program memory 133, and a disc address memory 134. When the data is a status, the data is supplied to the memory 132 and stored therein. When the data is a control program, the data is supplied to the memory 133 and stored therein. Further, when the data is a disc address, the data is supplied to the memory 134 and stored therein. A control program interpreter 135 is loaded into the personal computer 62 as described before. The status stored in the memory 132, the control program stored in the memory 133, and the disc address stored in the memory 134, are respectively translated into a language which is in conformance with the personal computer 62, and is further interpreted into commands such as input commands, output commands, and internal processing commands. Accordingly, signals are generated through an input/output (I/O) controller 139, to display a desired picture on a cathode ray tube (CRT) 140 or operate a printer 141, for example. In addition, according to the needs, the I/O controller 139 receives signals from an external device such as a floppy disc 142 and a conversational mode terminal (CMT) 143, or stores signals into these external devices. When the incoming command requests an information from an input device such as a keyboard 136, a joystick 137, and a tablet 138, the user manipulates the input device according to the request. In response to such manipulation by the user, the signals which are supplied to output devices such as the CRT 140 and the printer 141, are controlled by the I/O controller 139. Furthermore, a command which controls the disc reproducing apparatus, is generated and passed through a player control command converter 144, an RS232C driver 145, and an output terminal 146. This command is supplied to the RS232C receiver 120 within the interface box 57 shown in FIG. 17, through an input terminal 119.

The command which is received by the RS232C receiver 120, is supplied to the command analyser 121. The command analyser 121 carries out the operations which are in accordance with the flowcharts shown in FIGS. 24A, 24B, 24C, and 24D, and supplies an output signal to the player operation controller 122. In addition, the command analyser 121 generates the transmission request signal, and supplies this transmission request signal to the control program demodulator 115 and to the buffer memory and data selector 116.

Figure 24A:
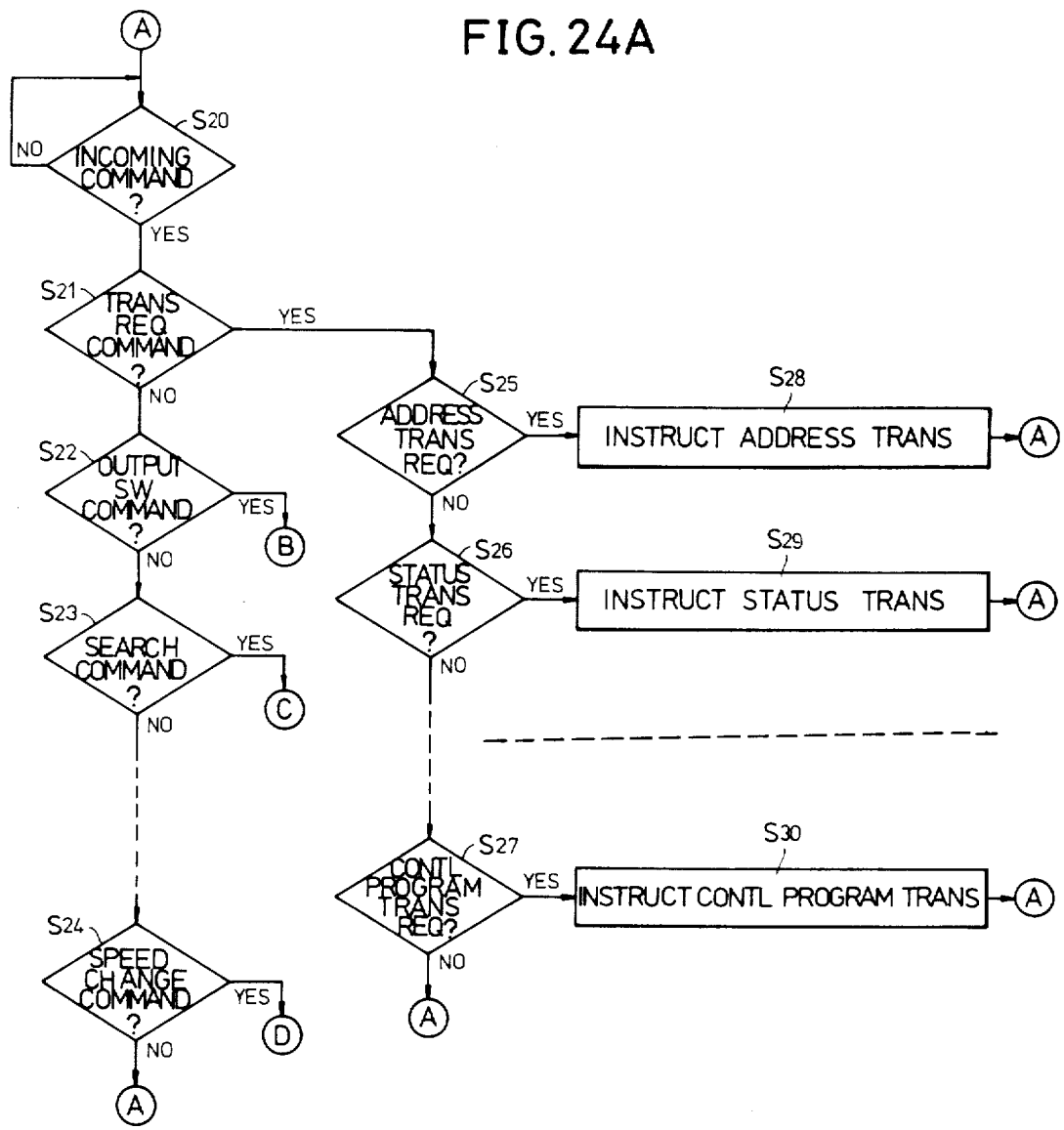
FIGS. 24A, 24B, 24C, and 24D respectively are flowcharts for explaining the operations of a command analyser in the block system shown in FIG. 17.

The operation of the command analyser 121 will now be described. In FIG. 24A, a step S20 detects the existence of an incoming command. When there is an incoming command, steps S21 through S24 respectively discriminate whether this incoming command is a transmission request command, an output switch command, a search instruction command, or a speed change command. The operation is returned to the step S20 when the incoming command does not correspond to any of these four commands. When it is discriminated that the incoming command is a transmission request command, steps S25 through S27 detect whether this transmission request command is an address transmission request, a status transmission request, or a control program transmission request. When the transmission request command is one of these three requests, steps S28 through S30 generate the transmission request signal described before which corresponds to the detected transmission request command and perform the instructions thereof. Thereafter, the operation is returned to the step S20.

Figure 24B:
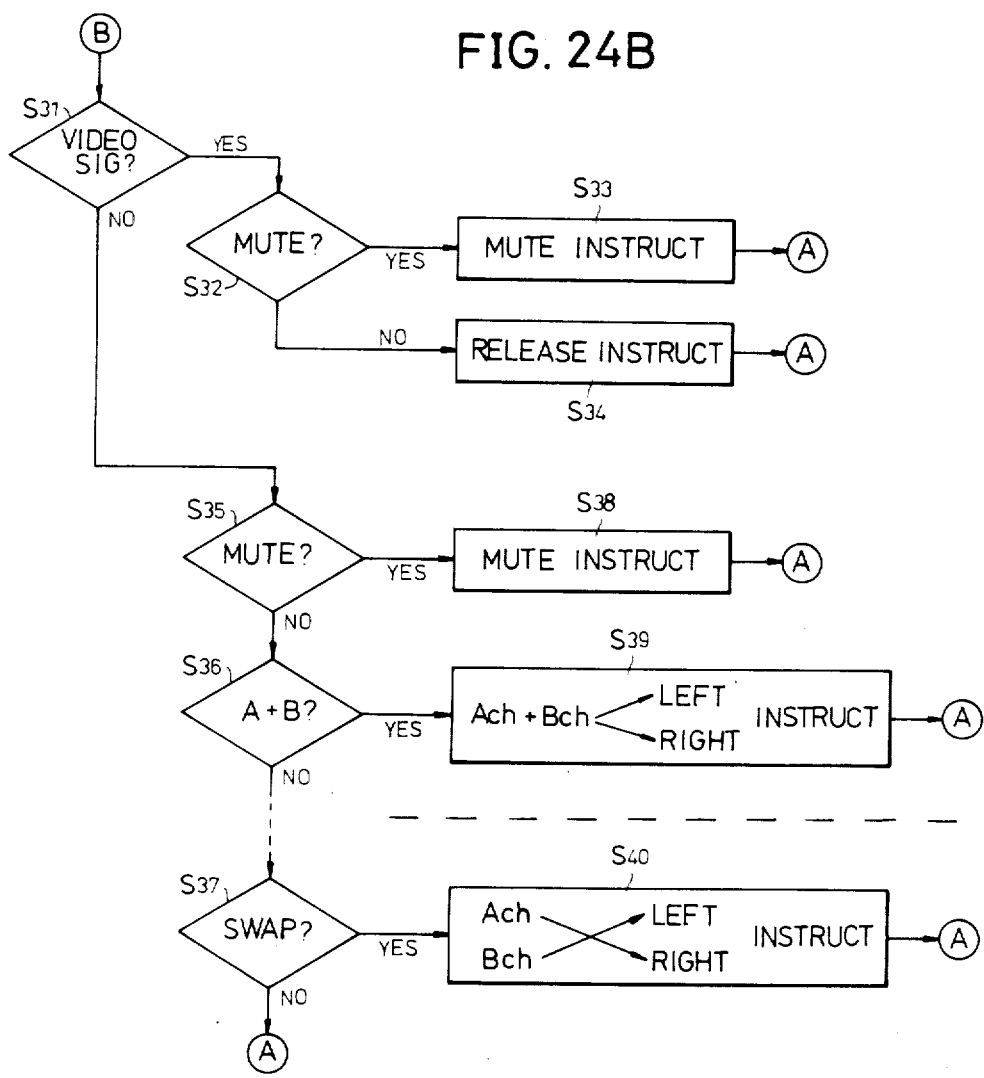

When the incoming command is an output switch command, a step 31 shown in FIG. 24B discriminates whether the signal which is to be switched is the video signal. When the video signal is to be switched, a step S32 discriminates whether a muting is to be performed. The operation is returned to the step S20, after an instruction which is in accordance with the discriminated result in the step S32 is performed in a step S33 or S34. On the other hand, when the signal which is to be switched is not the video signal, the step S31 discriminates that the audio signal is to be switched. Steps S35 through S40 discriminate whether a muting is to be performed, whether a multiplexed audio signal (A+B) of the first-channel and second-channel audio signals A and B is to be produced, and whether the first-channel audio signal A and the second-channel audio signal B are to be swapped, and perform instructions which are based on the discriminated results. The operation is thereafter returned to the step S20. The instructions in the steps S33, S34, and S38 through S40 are performed with respect to the player operation controller 122. The player operation controller 122 generates an output switch request signal which is in accordance with these instructions, and supplies this output switch request signal to the output controller 112 so as to control the output controller 112.

Figure 24C:
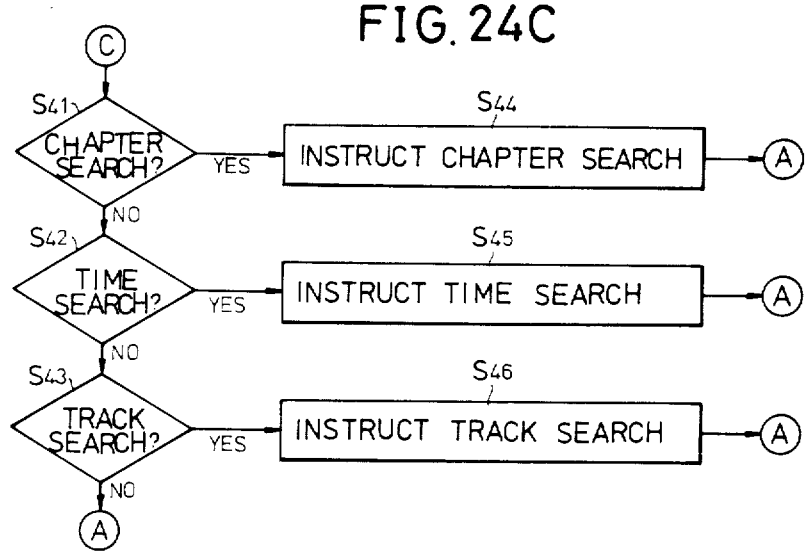

When the incoming command is a search instruction command, the command analyser 121 discriminates in steps S41 through S43 shown in FIG. 24C whether this search instruction command is a chapter search, a time search, or a track search. When the search instruction command does not correspond to any of these three searches, the operation is returned to the step S20. On the other hand, when the search instruction command corresponds to one of these three searches, steps S44 through S46 control the player operation controller 122 so as to perform the corresponding search. The operation is thereafter returned to the step S20. Accordingly, the player operation controller 122 generates a servo control request signal, and supplies this servo control request signal to the tracking servo system 111. The servo control request signal controls the rotation of the feed motor 79 so that the motor 79 rotates in a direction at a speed which is in accordance with a difference between the reproduced address signal of the kind which was instructed and the target address signal which has been set, controls and turns the tracking control operation ON or OFF, or the like. The player operation controller 122 extracts only the address signal $A_C$ from the output reproduced signal of the signal demodulator 110 in the case of the chapter search, extracts only the address signal $A_T$ in the case of the time search, and extracts only the address signal $A_N$ in the case of the track search.

Figure 24D:
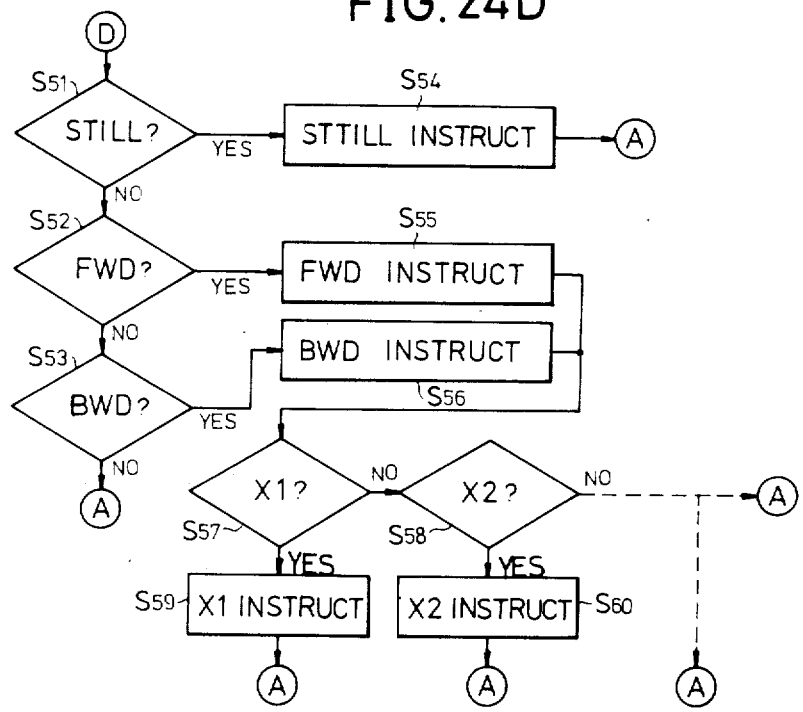

Further, when the incoming command is a speed change command, the command analyser 121 discriminates in a step S51 shown in FIG. 24D whether the moving speed of the signal pickup device 68 is zero (that is, whether the video disc player 56 is in the still-picture reproducing mode). When the video disc player 56 is in the still-picture reproducing mode, a step S54 supplies an appropriate instruction signal to the player operation controller 122, and the operation returns to the step S20. When the video disc player 56 is not in the still-picture reproducing mode, steps S52 through S60 discriminate whether the moving direction of the signal pickup device 68 is in the forward direction (toward the inner periphery of the disc, for example) or in the reverse direction (toward the outer periphery of the disc, for example) and instruct the direction according to the discriminated result, and further discriminate the moving speed of the signal pickup device 68 and instruct the speed according to the discriminated result. The instructions in the steps S54 through S56, S59, S60 and the like, are performed with respect to the player operation controller 122. The player operation controller 122 is constituted by the microprocessor 101 shown in FIG. 16 and the like.

The control program signal which is recorded on the disc 55 is reproduced, and the commands of the reproduced control program signal are supplied to the personal computer and then transmitted to the video disc player 56 from the personal computer 62. It takes approximately a time of 7 fields until the video disc player 56 actually carries out the operations which are based on the commands transmitted thereto. For this reason, the control program signal is obviously recorded at a position on the disc 55, which precedes a predetermined position on the disc 55 where a predetermined operation is to be carried out. But further, when a program is reproduced, the command or commands which are to be transmitted from the personal computer 62 with respect to the video disc player 56 are transmitted in advance to a buffer memory within the command analyser 121 and stacked therein. The command analyser 121 thus determines whether the reproduced address information from the disc 55 coincides with the address of the stacked command, and supplies a control signal to the player operation controller 122 when the reproduced address information and the address of the stacked command coincide. Therefore, the video disc player 56 can carry out the predetermined operation which is in accordance with the stacked command, with an extremely short time lag from the time when the predetermined position on the disc 55 is reached. In this case, a predetermined signal processing is performed during one field in which the reproduced address information having a predetermined value is obtained, and the video disc player 56 can carry out the operation which is based on the stacked command from the subsequent field. Hence, the time lag is only one field.

As described before, the video disc player 56 carries out various operations by moving the reproducing stylus based on the control commands which are transmitted from the personal computer 62 to the video disc player 56. For example, the reproducing stylus may be moved to a predetermined track position at a high speed to carry out a search operation. Moreover, the video disc player 56 may carry out a still-picture reproduction, or search for a program of a predetermined chapter number after carrying out a normal reproduction for a specific time.

The recorded video and audio signals which are reproduced from the disc 55 in the video disc player 56, are respectively supplied to the TV monitor 113 which displays the reproduced picture and to the speaker 114 which generates the reproduced sound. At the same time, it is possible to reproduce the recorded control program from the disc 55. As a result, the commands may be transmitted bi-directionally between the disc reproducing apparatus 60 and the external device 61, and it is possible to carry out an interactive reproduction.

Figure 25:
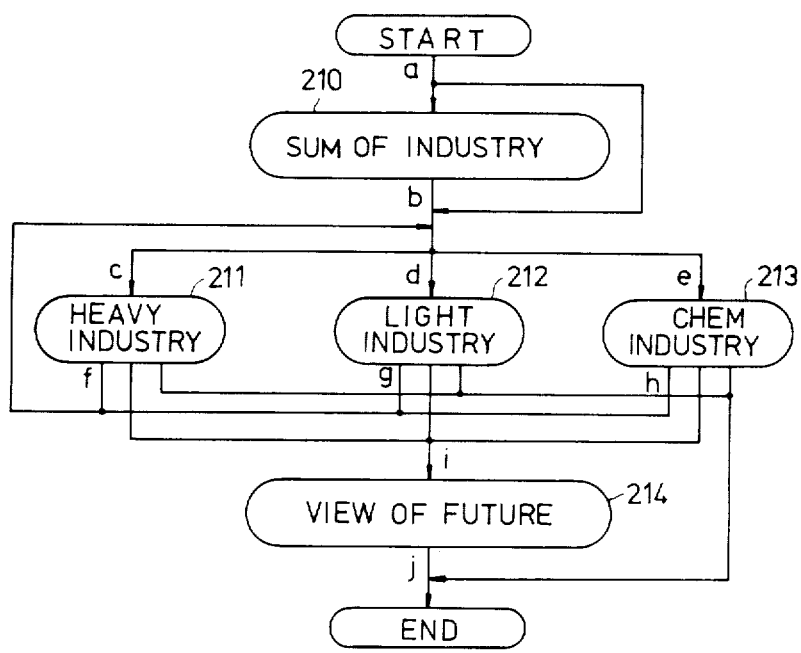
FIG. 25 is a diagram for explaining an example of the recorded information content on the disc, the recorded position of the control program signal, and the content of the control program.

For example, the recorded information on the disc 55 may be related to a commentary on the Japanese industry, as shown in FIG. 25. This commentary is made up from pieces of a summary 210 of the industry, a commentary 211 on the heavy industry, a commentary 212 on the light industry, a commentary 213 on the chemical industry, and a commentary 214 on the view of the future. It will be assumed that the summary and commentaries are each recorded over 10000 tracks in a time-sequential manner. In addition, it will be assumed that a control program signal which permits the user to select a search, is recorded from a position a having a track address "200" which is immediately prior to the summary 210, and a position b having a track address "9700" where the recording of the summary 210 is terminated. Furthermore, it will be assumed that a control program signal which permits the user to select one of the commentaries 211 through 213 and enables a search to the beginning of the selected commentary, is recorded from the position b. Moreover, it will be assumed that a control program signal which permits the user to make a selection at positions f through h where the recording of respective commentaries 211 through 213 is terminated, to select whether to return to the position b, reproduce the commentary 214, or skip to a final position j where the recording is terminated.

In this case, the control program which is reproduced from the track address "200" and is in an intermediate language "IF INKEY$="N" THEN SEARCH 9700", for example, is subjected to the signal processing including the error correction described before and the like, and is then transmitted to the personal computer 62 through the RS232C driver 117. The personal computer 62 decodes the control program supplied thereto, and detects the input from the keyboard 136. When the input from the keyboard 136 is the alphabet "N", the personal computer 62 generates a command "SEARCH 9700" which means to search the track address "9700". This command "SEARCH 9700" is supplied to the interface box 57 through the RS232C driver 145. When the command analyser 121 decodes this command upon its receipt, and causes the player operation controller 122 to execute the search command. In this state, the recorded signals on the disc 55 which exist from the position immediately subsequent to the position where the command is reproduced up to the position immediately prior to the track address "9700", will not be reproduced.

On the other hand, when the input from the keyboard 136 is the alphabet "N", the search operation is not carried out. Accordingly, the normal reproduction is continued up to a track address "9900".

Next, a control program "ON KEY SEARCH 10000, SEARCH 20000, SEARCH 30000" is reproduced from the track address "9900". This control program enables one of the commentaries 211, 212, and 213 to be selectively reproduced. When the input from the keyboard 136 is "1", the personal computer 62 supplies a command "SEARCH 10000" to the interface box 57. Similarly, the personal computer 62 supplies commands "SEARCH 20000" and "SEARCH 30000" to the interface box 57 when the input from the keyboard 136 is "2" and "3", respectively. Thus, operations similar to those described above, are carried out. Similar operations are carried out thereafter.

The present invention is not limited to the embodiments described heretofore. For example, the present invention may be applied to an optical type disc. The recorded signals on the optical type disc are reproduced by detecting the variations in the intensity of light which is reflected from or transmitted from the disc, by impinging a light beam on the disc. The present invention may also be applied to a case where only one channel of the audio signal exists. Moreover, the control program signal may be recorded independently in an intermittent manner, instead of the second-channel audio signal. In the embodiment described before, it was described that the disc language interpreter is loaded into the external device 61. However, the disc reproducing apparatus may be coupled to the external device 61 which is put into an operational state by the monitor of the personal computer or an operating system (OS).

The player operation controller 122 may also control the rotation of the motor which rotates the turntable onto which the disc 55 is placed, based on a control signal from the command analyser 121.

Moreover, when playing a disc recorded with the control program signal which is time-sequentially multiplexed with the audio signal, the operation of the demodulator which demodulates the modulated signal which is obtained by modulating the control program signal by the self-clock modulation system, may be controlled based on a discriminated result which is obtained by discriminating the ninth bit of the track number address signal, which ninth bit contains the information related to the existence of a recorded control program signal. In this case, the demodulator which demodulates the modulated signal is controlled so that the demodulator operates only during the reproduction of the control program signal, and does not operate during the reproduction of the audio signal.

In addition, although an illustration thereof is omitted in FIG. 8, a noise reducing circuit is provided on the output side of each of the audio signal sources 27 and 28, and a pre-emphasis circuit is provided on the output side of the switching circuit 31.

Further, the present invention is not limited to these embodiments, but various variations and modifications may be made without departing from the scope of the present invention.

What is claimed is:

1. A control program signal demodulating device suitable for an interactive operation of a player for playing a rotary recording medium and an external control device which is coupled to said player so that said external control device controls an operation of said player depending on an external instruction and depending on a control program which is loaded into said external control device, said control program including input and output commands and internal processing commands of said external control device, said rotary recording medium comprising track turns which are recorded with at least a control program signal, a video signal and an address signal, said player comprising a pickup reproducing element for scanning said track turns so as to reproduce recorded signals from said rotary recording medium and a controller for controlling a reproducing track position of said pickup reproducing element and for producing a status data signal which indicates an operating state of said player, said address signal indicating a track turn which is being scanned by said pickup reproducing element, said control program signal demodulating device comprising:

a control program demodulator for demodulating said control program signal which is reproduced from said rotary recording medium, the demodulated control program signal indicating said control program;

memory means for at least temporarily storing the demodulated output signal of said control program demodulator, said status data signal and said address signal and for producing the stored signals;

selecting means for selecting one of the signals which are produced by said memory means;

interface means for transmitting the signal which is selected by said selecting means to said external control device, and for receiving at least one control command which is produced by said external control device depending on said external instruction and said control program; and a command analyser for decoding said at least one control command received by said interface means, and for supplying a signal to said controller so as to control the operation of said player and supplying a transmission request signal to said selecting means so as to determine which one of the signals produced by said memory means is selected by said selecting means, said control program demodulator comprising wave-shaping means for wave-shaping the reproduced control program signal, first and second flip-flops coupled in series so that an output signal of said wave-shaping means is applied to an input terminal of said first flip-flop and an output signal of said first flip-flop is applied to an input terminal of said second flip-flop, said first and second flip-flops respectively having a clock terminal applied with the horizontal synchronizing signal of the reproduced video signal, and comparing means for comparing the output signal of said first flip-flop and an output signal of said second flip-flop and for producing an output signal which has a level depending on whether or not the output signals of said first and second flip-flops are equal to each other.

2. A control program signal demodulating device as claimed in claim 1 which is integrally designed with said player and constitutes a disc reproducing apparatus together with said player, said rotary recording medium being recorded with a band limited modulated signal and the video signal on the same track turn of a spiral track or concentric tracks thereof in synchronism with the horizontal synchronizing signal in the video signal, said band limited modulated signal being recorded in a state where said band limited modulated signal is time-sequentially multiplexed with an audio signal or recorded independently instead of the audio signal, said band limited modulated signal being obtained by subjecting said control program signal to a modulation based on a reference clock signal having a period which is a natural number multiple of the horizontal scanning period of the video signal and by limiting the band of the modulated signal to the band of the audio signal, said player comprising: a signal demodulator for obtaining the video signal, the audio signal and said band limited modulated signal from the signal which is reproduced by said pickup reproducing element, and for supplying the obtained video and audio signals to a television monitor and a speaker, respectively, under the control of said controller, said signal demodulator supplying said band limited modulated signal to said control program demodulator, said controller controlling the rotation of said rotary recording medium by use of the output signal of said command analyser.

3. A control program signal demodulating device as claimed in claim 1 in which said control program signal is recorded on said rotary recording medium so that information bits of the control program signal and an error correcting code for detecting and correcting an error of the control program signal are interleaved with each other, and said control program demodulator comprises means for returning a sequence of the information bits of the demodulated control program signal into an original sequence and means for carrying out an error detection and an error correction with respect to the the demodulated control program signal by use of said error correcting code.

4. A control program signal demodulating device as claimed in claim 1 in which said interface means comprises an RS232C interface, and said external control device comprises an RS232C interface which couples with the RS232C interface of said interface means, said external control device being made operative by an interpreter, monitor, or an operating system.

5. A control program signal demodulating device as claimed in claim 1 in which said demodulating means demodulates the control program signal which is reproduced from the rotary recording medium in terms of blocks each having a fixed length of approximately one field.

6. A control program signal demodulating device as claimed in claim 1 in which said control program is written in an intermediate language which is in conformance with a preset format and is basically written in direct statements, and the format of said intermediate language is independent of the format of a language which is originally set with respect to said external control device.

7. A control program signal demodulating device as claimed in claim 1 in which said command analyser comprises a memory for stacking the control command which is transmitted in advance based on the control program which is loaded into said external control device, and supplies to the player the signal which controls the operation of the player based on the control command when the value of an address signal which is reproduced from the rotary recording medium coincides with the address of said control command.

8. A control program signal demodulating device as claimed in claim 1 in which said control program signal is supplied to said control program demodulator without passing through a noise reducing circuit.

9. A control program signal demodulating device as claimed in claim 2 in which said signal demodulator discriminates and separates a discriminating signal from said address signal which is reproduced from the rotary recording medium, said discriminating signal contains information indicating that said control program signal is recorded on the track turns which are recorded with said discriminating signal, and said control program demodulator is supplied with a signal which is reproduced from the rotary recording medium only when said signal demodulator discriminates from said discriminating signal that said pickup reproducing element is reproducing the control program signal from the rotary recording medium.

10. A control program signal demodulating device suitable for an interactive operation of a player for playing a rotary recording medium and an external control device which is coupled to said player so that said external control device controls an operation of said player depending on an external instruction and a control program which is loaded into said external control device, said control program including input and output commands and internal processing commands of said external control device, said rotary recording medium comprising track turns which are recorded with at least a control program signal, a video signal and an address signal, said player comprising a pickup reproducing element for scanning said track turns so as to reproduce recorded signals from said rotary recording medium and a controller for controlling a reproducing track position of said pickup reproducing element and for producing a status data signal which indicates an operating state of said player, said address signal indicating a track turn which is being scanned by said pickup reproducing element, said control program signal demodulating device comprising:

a control program demodulator for demodulating said control program signal which is reproduced from said rotary recording medium, the demodulated control program signal indicating said control program;

memory means for at least temporarily storing the demodulated output signal of said control program demodulator, said status data signal and said address signal and for producing the stored signals;

selecting means for selecting one of the signals which are produced by said memory means;

interface means for transmitting the signal which is selected by said selecting means to said external control device, and for receiving at least one control command which is produced by said external control device depending on said external instruction and said control program; and a command analyser for decoding said at least one control command received by said interface means, and for supplying a signal to said controller so as to control the operation of said player and for supplying a transmission request signal to said selecting means so as to determine which one of the signals produced by said memory means is selected by said selecting means, said control program demodulating the reproduced control program signal in terms of two horizontal scanning periods of the reproduced video signal so that said control program demodulator detects levels of said control program signal at two times in synchronism with one horizontal synchronizing signal and the next horizontal synchronizing signal and produces an output signal which has a level depending on whether or not the detected levels of said control program signal are equal to each other.

* * * * *